(12) United States Patent
Yamada et al.

(10) Patent No.: US 8,052,285 B2
(45) Date of Patent: Nov. 8, 2011

(54) PROJECTION DISPLAY HAVING IMPROVED LIGHT SHIELDING BODIES FOR ADJUSTING THE AMOUNT OF LIGHT APPLIED TO A LIGHT VALVE THEREIN

(75) Inventors: Akihiro Yamada, Tokyo (JP); Tomohiro Bessho, Tokyo (JP); Akira Daijogo, Tokyo (JP); Motoo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 679 days.

(21) Appl. No.: 12/153,352

(22) Filed: May 16, 2008

(65) Prior Publication Data

US 2008/0304022 A1 Dec. 11, 2008

(30) Foreign Application Priority Data

Jun. 5, 2007 (JP) .................................. 2007-149366
Feb. 14, 2008 (JP) .................................. 2008-032978

(51) Int. Cl.
  *G03B 21/14* (2006.01)
(52) U.S. Cl. .......................................... 353/97; 353/88
(58) Field of Classification Search .................... 353/38, 353/85, 86, 87, 88, 89, 90, 91, 92, 93; 359/739, 359/740
  See application file for complete search history.

(56) References Cited

U.S. PATENT DOCUMENTS

| | | | |
|---|---|---|---|
| 2,896,525 A | 7/1959 | Smith | |
| 6,769,777 B1 * | 8/2004 | Dubin et al. | 353/97 |
| 7,661,829 B2 * | 2/2010 | Yamada et al. | 353/88 |
| 2004/0080722 A1 * | 4/2004 | Yamasaki et al. | 353/97 |
| 2005/0001938 A1 * | 1/2005 | Koba | 348/744 |
| 2005/0068505 A1 * | 3/2005 | Momose et al. | 353/97 |
| 2005/0219474 A1 * | 10/2005 | Hara et al. | 353/88 |
| 2006/0050248 A1 * | 3/2006 | Koga et al. | 353/97 |
| 2006/0050249 A1 | 3/2006 | Hashimoto et al. | |
| 2007/0035702 A1 | 2/2007 | Shimizu et al. | |
| 2007/0064203 A1 | 3/2007 | Sawai | |
| 2008/0043312 A1 * | 2/2008 | Yamada et al. | 359/233 |
| 2009/0174869 A1 * | 7/2009 | Inui et al. | 353/91 |

FOREIGN PATENT DOCUMENTS

| | | |
|---|---|---|
| CN | 1723415 A | 1/2006 |
| CN | 101126891 A | 2/2008 |
| EP | 1 607 794 A1 | 12/2005 |
| JP | 2004-69966 A | 3/2004 |

(Continued)

*Primary Examiner* — Georgia Y Epps
*Assistant Examiner* — Bao-Luan Le
(74) *Attorney, Agent, or Firm* — Birch, Stewart, Kolasch & Birch, LLP

(57) ABSTRACT

The invention provides a projection display that achieves continuous light amount control with ease and without causing unevenness of illumination of light applied to a light valve responsive to a video signal, thereby allowing constant image display with satisfactory contrast. The projection display of the invention includes a light valve (2); a light source (3a) generating light applied to the light valve (2); an integrator lens (4) provided on an optical path between the light source (3a) and the light valve (2) and making uniform the illumination distribution of light applied from the light source (3a) to the light valve (2); and a light amount control system (9) provided on the optical path and including a turning mechanism (9a) which turns like a set of double doors in order to adjust the amount of light applied from the light source (3a) to the light valve (2). The turning mechanism (9a) is bent into a V shape in a direction to reduce the amount of light (to block the light).

26 Claims, 26 Drawing Sheets

FOREIGN PATENT DOCUMENTS

| | | |
|---|---|---|
| JP | 2005-17500 A | 1/2005 |
| JP | 2005-31103 A | 2/2005 |
| JP | 2006-343513 A | 12/2006 |
| JP | 2008-46468 A | 2/2008 |
| WO | WO-2005/026835 A1 | 3/2005 |

* cited by examiner

F I G . 2 1 A
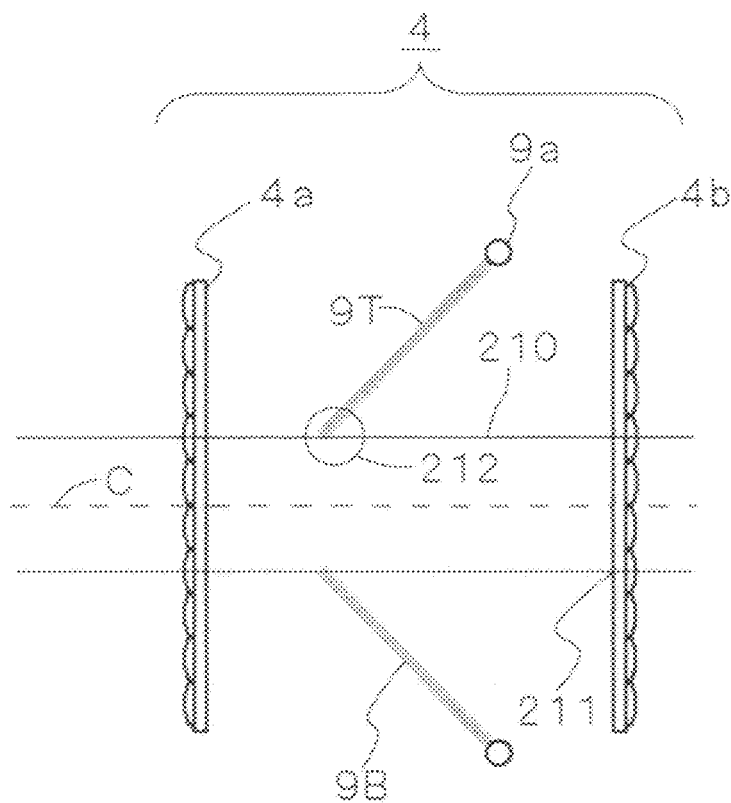
F I G . 2 1 B
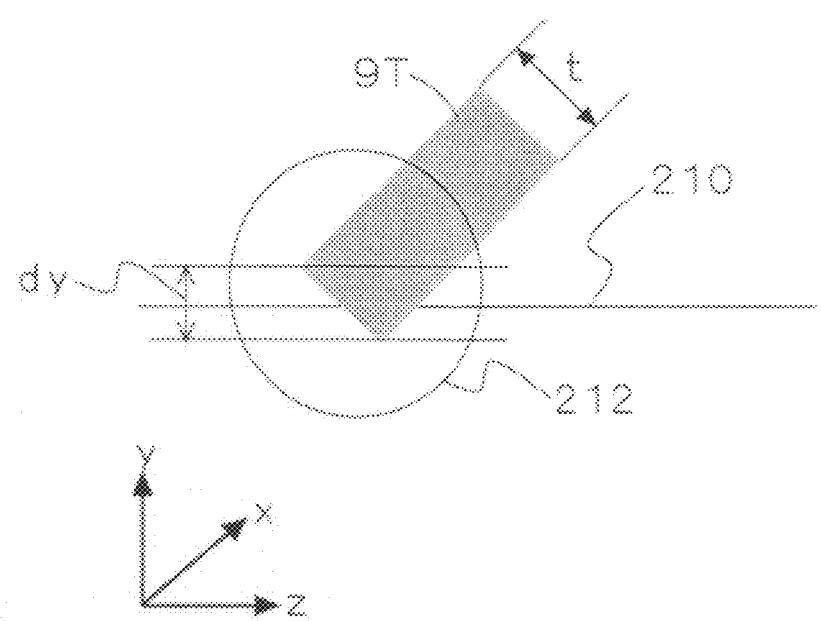

F I G. 2 8 A
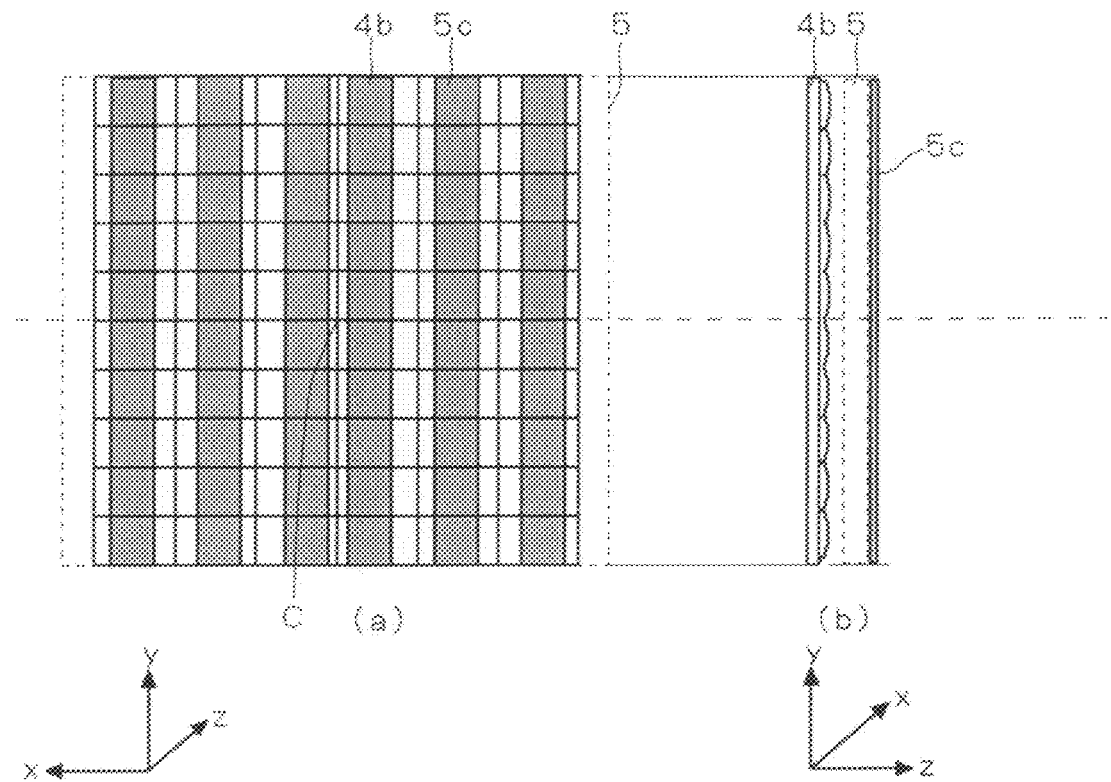
(a)  (b)
F I G. 2 8 B
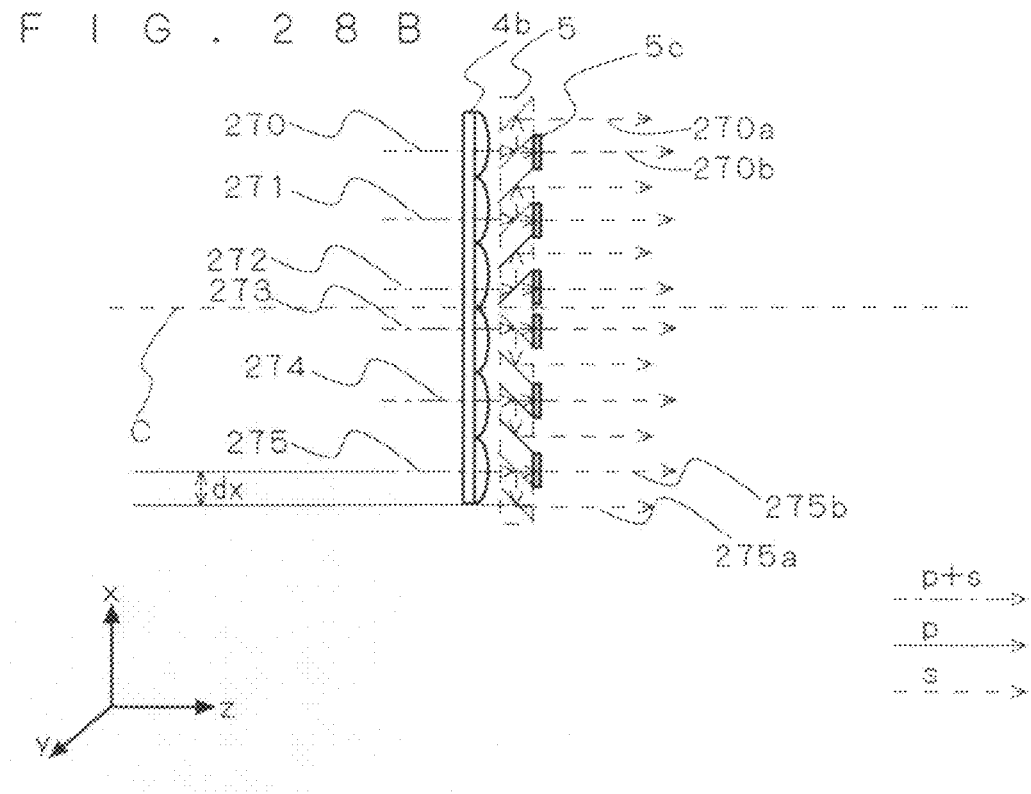

PROJECTION DISPLAY HAVING IMPROVED LIGHT SHIELDING BODIES FOR ADJUSTING THE AMOUNT OF LIGHT APPLIED TO A LIGHT VALVE THEREIN

BACKGROUND OF THE INVENTION

1. Field of the Invention

The present invention relates to a projection display with a light-amount control mechanism for adjusting the amount of light applied to a light valve responsive to a video signal.

2. Description of the Background Art

A projection display is apt to have difficulty in ensuring high contrast because dark projected images displayed are not sufficiently dark due to leakage of light from various optical elements in an optical system such as a guide optical system and a projection lens and due to stray light (unnecessary light) caused by the optical elements. In particular for image projection on a screen in a dark room, insufficient darkness of dark projected images on display gives to a viewer the impression of low contrast. Especially in projection displays using liquid crystal light valves, although the liquid crystal light valves block transmitted light in response to the polarization property of light, complete blocking of transmitted light is difficult and there is also a limit in counteractive actions taken by video signal processing so that an improvement in contrast is required.

As a measure to solve this problem, a flat light shielding plate is provided between first and second lens arrays and is turned in response to a video signal to control the amount of light applied to a light valve and thereby to improve the contrast of a projected image on a screen or the like (for example, see WO2005/026835).

In WO2005/026835, in the case where the light shielding plate has at its tip a rectangular plane in a direction vertical to the light shielding plate, if the tip of the light shielding plate is in the vicinity of the first lens array and in a position of the center of the curvature of the second lens array in the turning direction of the light shielding plate, the rectangular plane of the light shielding plate is imaged onto a light valve. This undesirably causes linear unevenness of illumination on the light valve in a direction perpendicular to the turning direction and the optical axis direction. Besides, it is difficult to provide satisfactory contrast depending on the shape of the tip of the light shielding plate.

SUMMARY OF THE INVENTION

An object of the invention is to provide a projection display that achieves continuous light amount control with ease and without causing unevenness of illumination of light applied to a light valve responsive to a video signal, thereby allowing constant image display with satisfactory contrast.

A projection display according to the invention includes a light valve; a light source generating light applied to the light valve; an integrator lens provided on an optical path between the light source and the light valve and making uniform an illumination distribution of light applied from the light source to the light valve; and a light-amount control mechanism provided on the optical path and including a pair of light shielding bodies that turn like a double door in order to adjust the amount of light applied from the light source to the light valve. The light shielding bodies are bent into a V shape in a direction so as to reduce the amount of light during their turning.

Since the light shielding bodies are bent into a V shape in a direction to reduce the amount of light during their turning, continuous light amount control can be achieved with ease and without causing unevenness of illumination of light applied to the light valve responsive to a video signal. This allows constant image display with satisfactory contrast.

These and other objects, features, aspects and advantages of the invention will become more apparent from the following detailed description of the invention when taken in conjunction with the accompanying drawings.

BRIEF DESCRIPTION OF THE DRAWINGS

FIGS. 21A and 21B show the turning position of the turning mechanism when imaged on the light valve according to the second preferred embodiment of the invention;

FIGS. 28A and 28B show the paths of light passing through the second lens array and the polarization conversion element according to the third preferred embodiment of the invention;

DESCRIPTION OF THE PREFERRED EMBODIMENTS

Preferred embodiments of the invention are described below with reference to the drawings.

First Preferred Embodiment

Figure 1:
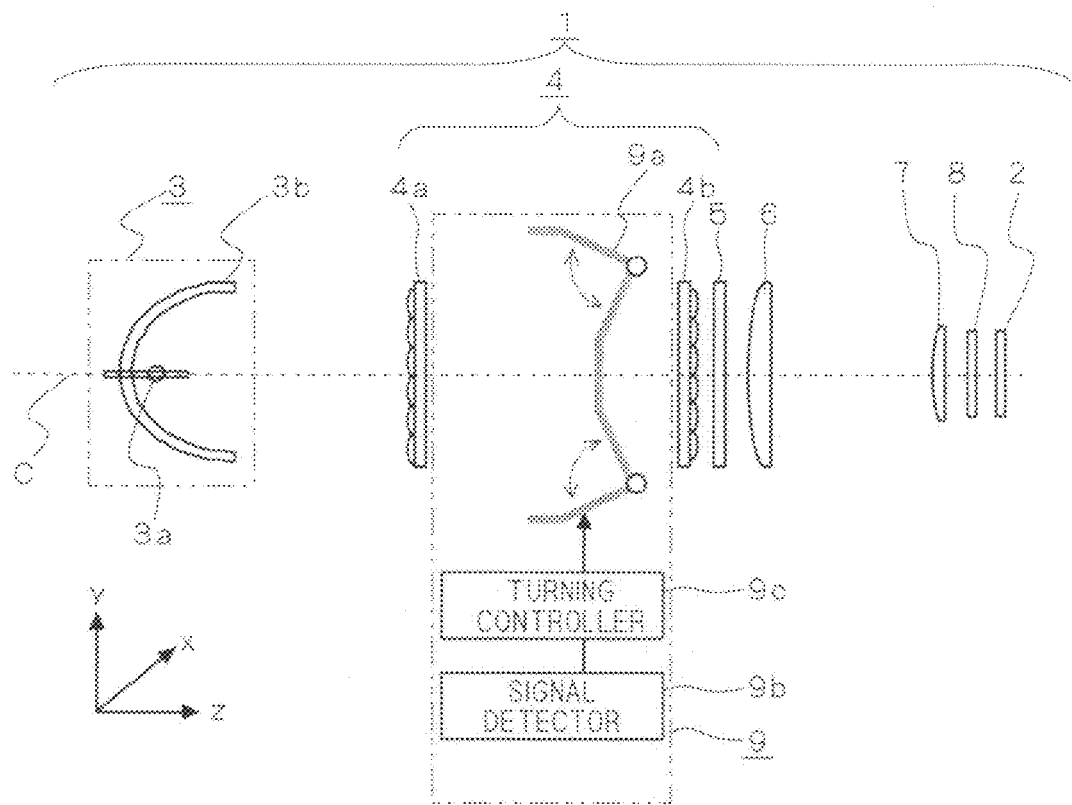
FIG. 1 is a block diagram of an illumination optical system in a projection display according to a first preferred embodiment of the invention.

FIG. 1 is a block diagram of an illumination optical system 1 in a projection display according to a first preferred embodiment of the invention. As shown in FIG. 1, the illumination optical system 1 includes an integrator lens 4 between a light source system 3 and a light valve 2, a polarization conversion element 5, a condensing lens 6, a field lens 7, and a polarizing plate 8. The projection display according to the first preferred embodiment of the invention further includes a projection lens (not shown) for projecting light emitted from the light valve 2 onto a screen. The light valve 2 is provided on each of the optical paths of R, G, and B, and the illumination optical system 1 shown in FIG. 1 is a representative example of any one of those optical paths of R, G, and B.

The light valve 2 according to the preferred embodiments of the invention is a liquid crystal light valve, but in the case of using lens arrays, it may be other display devices such as a digital micro-mirror device (DMD) and a reflection liquid crystal display device.

The light source system 3 is configured to apply light to the light valve 2 and includes a light source 3a and a reflecting mirror 3b that reflects light emitted from the light source 3a to irradiate the integrator lens 4. The light source 3a is in general a high-pressure mercury lamp, a halogen lamp, or a xenon lamp, but it may be any other light-emitting devices such as a light emitting diode (LED), a laser, and an electrodeless discharge lamp. The reflecting mirror 3b is formed in an elliptical plane or a parabolic plane, but it may be of any shape and any configuration and is not limited to those described as long as light can be concentrated on the polarization conversion element 5. For example, in order to make incident light on the integrator lens 4 approximately parallel to an optical axis C, the reflecting mirror 3b should be formed in the shape of a parabola; or if the reflecting mirror 3b is formed in the shape of an ellipse, a concave lens should be provided between the light source system 3 and the integrator lens 4 (see FIG. 32).

The integrator lens 4 is provided on an optical path between the light source system 3 and the light valve 2 and is configured to make uniform the illumination distribution of light applied from the light source system 3 to the light valve 2. The integrator lens 4 includes a first lens array 4a and a second lens array 4b spaced apart from the first lens array 4a. The first lens array 4a and the second lens array 4b each are an array of a plurality of convex lenses. The convex lenses in the first lens array 4a and the convex lenses in the second lens array 4b correspond to each other and are located to face each other.

Figure 2:
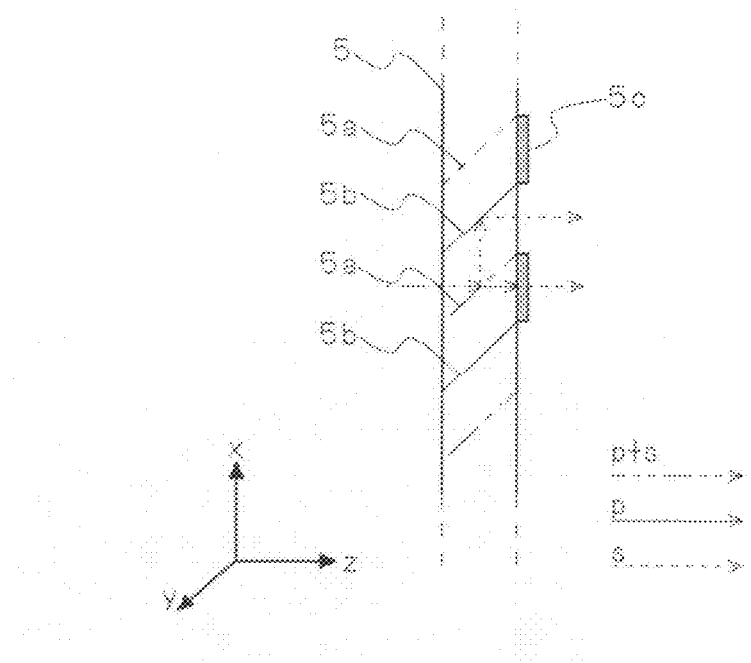
FIG. 2 is a block diagram of a polarization conversion element according to the first preferred embodiment of the invention.

The polarization conversion element 5 converts light beams incident on the polarization conversion element 5 into a single type of linearly polarized light and emits the linearly polarized light. It is provided with an appropriate space in the x-axis direction. FIG. 2 is a block diagram of the polarization conversion element 5 according to the first preferred embodiment of the invention. As shown in FIG. 2, the polarization conversion element 5 includes a plurality of polarization separation films 5a inclined (e.g., 45 degrees) toward the direction of the optical axis C (the z direction); a plurality of reflection films 5b provided between the polarization separation films 5a and inclined (e.g., 45 degrees) toward the direction of the optical axis C (the z direction); and λ/2 phase-difference plates 5c provided in a plane of the polarization conversion element 5 on the side of the light valve 2 and in positions where light passing through the polarization separation films 5a are applied. Light incident on the polarization conversion element 5 is separated into s-polarized light and p-polarized light by the polarization separation films 5a. The p-polarized light is transmitted through the polarization separation films 5a, is converted into s-polarized light by the λ/2 phase-difference plates 5c, and then is emitted from the polarization conversion element 5. On the other hand, the s-polarized light is reflected off the polarization separation films 5a and off the reflection films 5b and then is emitted from the polarization conversion element 5. Accordingly, the outgoing beams from the polarization conversion element 5 are almost all s-polarized light.

The light-amount control system 9 (light-amount control mechanism) is provided on the optical path and includes a turning mechanism 9a which includes a pair of light shielding bodies that turn like a double door in order to adjust the amount of light applied from the light source system 3 to the light valve 2. The light-amount control system 9 includes the turning mechanism 9a provided between the first lens array 4a and the second lens array 4b; a signal detector 9b detecting a video signal fed to the light valve 2 and calculating, based on the result of detection, the relative percentage of the amount of light applied to the light valve 2; and a turning controller 9c controlling the turning of the turning mechanism 9a based on the relative percentage of the amount of light calculated by the signal detector 9b. As shown in FIG. 3B, the turning mechanism 9a includes light shielding bodies 9T and 9B that are bent into a V shape in a direction to reduce the amount of light (to block the light). The light shielding bodies 9T and 9B have at their tips cuts 9g that regulate passage of light. The cuts 9g may be of any shape such as a concave curve, a parabola, a semi-ellipse, and a triangle.

Next, description is given on improvement in contrast. When a video signal represents 100% of the relative percentage of the amount of light, control is performed based on 100% of the relative percentage of the amount of light with no light blocking by the turning mechanism 9a. For example when a video signal represents 20% of the relative percentage of the amount of light, the turning mechanism 9a blocks the light until the relative percentage of the amount of light becomes 20%, so that approximately a five-fold fine adjustment of the video signal is possible. By lowering the relative percentage of the amount of light by light blocking using the turning mechanism 9a, darker black can be obtained as compared with the case where a video signal represents 0% of the relative percentage of the amount of light in which case no light blocking is provided. In other words, since the transmittance of the light valve 2 is approximately constant, reducing the amount of light applied to the light valve 2 using the turning mechanism 9a makes it possible to darken a projected image on a screen, thereby achieving improvement in contrast.

Figure 3A:
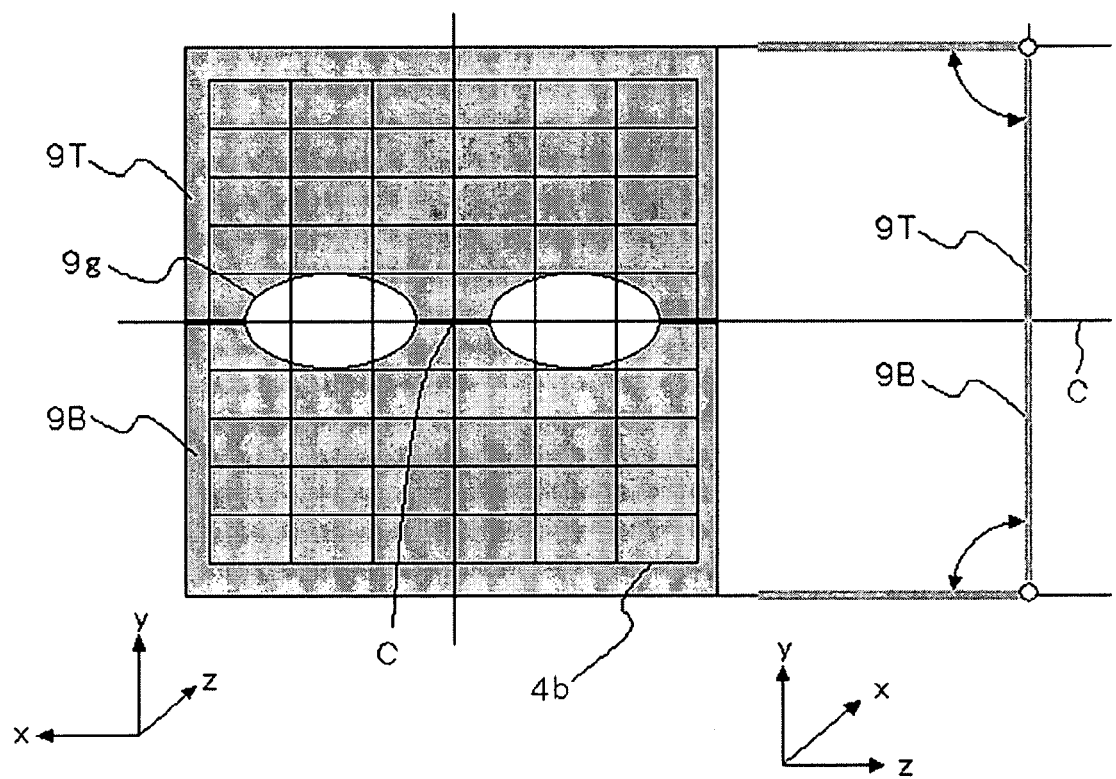
FIGS. 3A and 3B show examples of the shapes of a turning mechanism according to the first preferred embodiment of the invention.
Figure 3B:
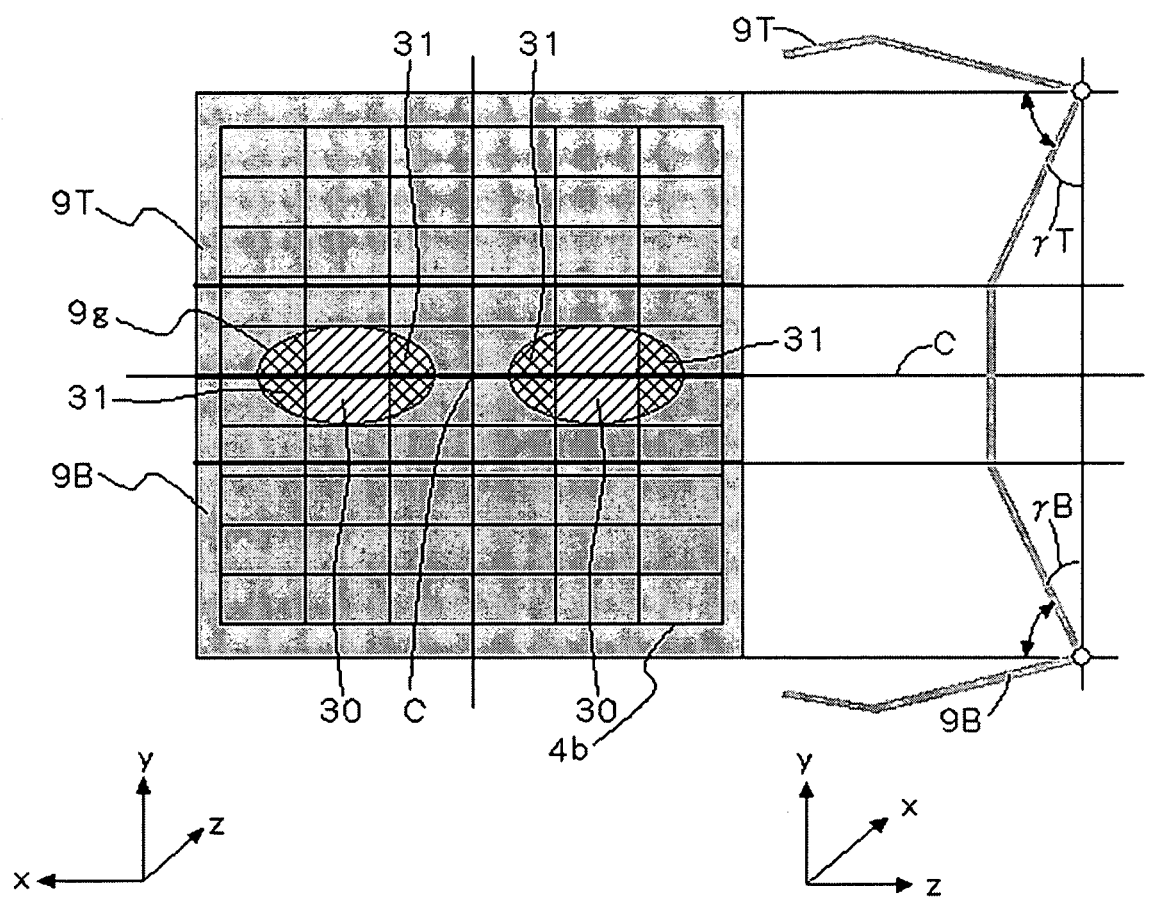
Figure 4A:
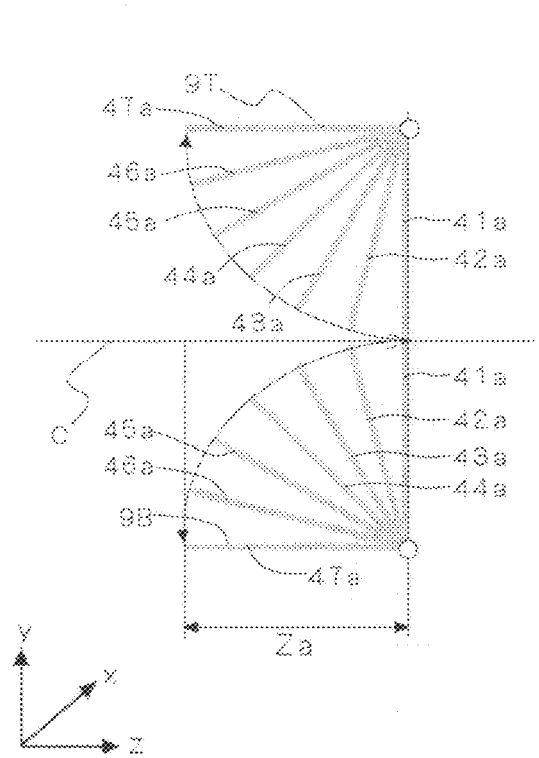
FIGS. 4A and 4B show the turning of the turning mechanism according to the first preferred embodiment of the invention.
Figure 4B:
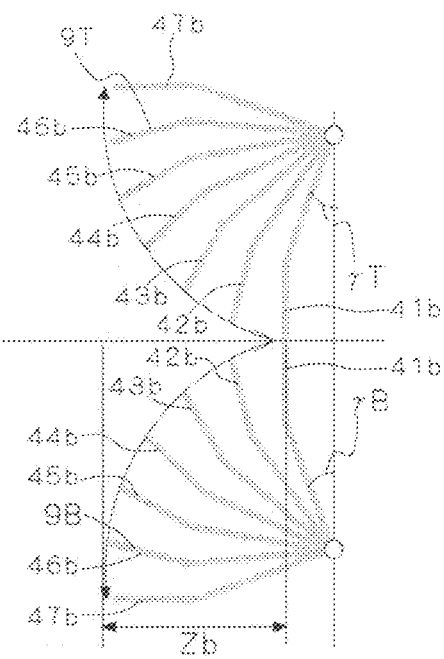

FIG. 4A shows a 15-degree turning of the light shielding bodies 9T and 9B of FIG. 3A, and FIG. 4B shows a 15-degree turning of the light shielding bodies 9T and 9B of FIG. 3B. Referring to the amounts of travel of the tips of the light shielding bodies 9T and 9B in the z direction, as shown in FIGS. 4A and 4B, the amount of travel Zb in FIG. 4B is smaller than the amount of travel Za in FIG. 4A (Za>Zb), from which it can be found that the amount of travel of the light shielding bodies 9T and 9B in the y direction per turning angle is greater in FIG. 4B. Accordingly, the light shielding bodies 9T and 9B in the shape as shown in FIG. 4B can provide illumination with 100% of the relative percentage of the amount of light at a smaller turning angle.

Figure 5:
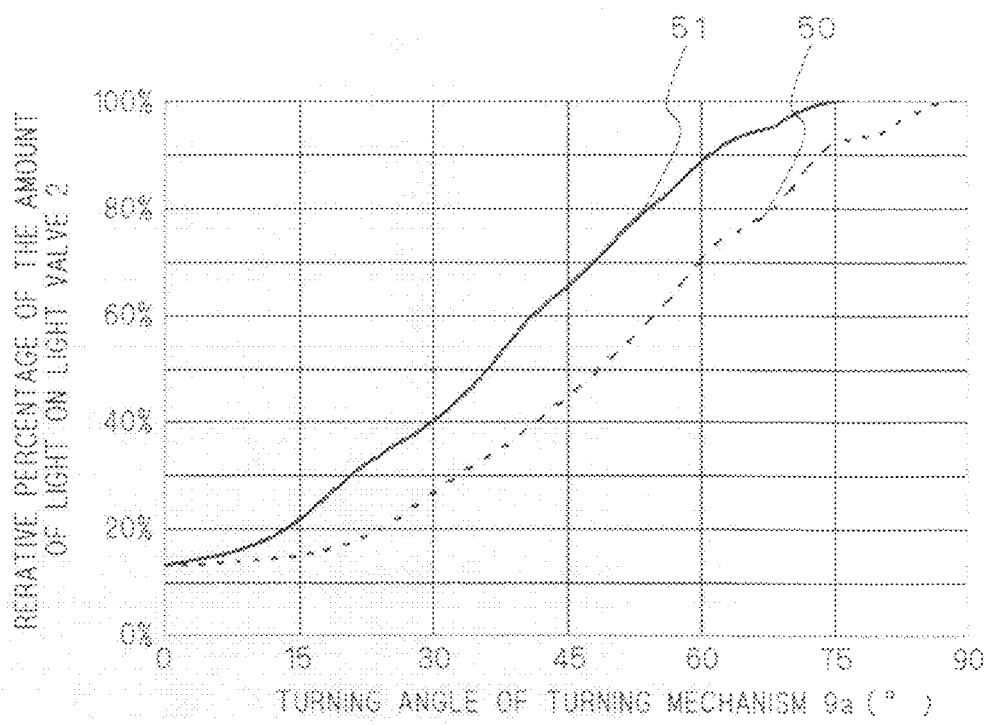
FIG. 5 shows the relationship between the turning angle and the relative percentage of the amount of light in the cases where the turning mechanism is in the shapes of FIGS. 3A and 3B according to the first preferred embodiment of the invention.

FIG. 5 shows the relationship between the turning angle and the relative percentage of the amount of light in the cases where the turning mechanism 9a is in the shapes of FIGS. 3A and 3B. The angles γT and γB in FIG. 3B shall be 20 degrees and the turning mechanism 9a in both FIGS. 3A and 3B turns two degrees at a time. The turning angle of 0 degree refers to the condition that the light shielding bodies 9T and 9B are in completely closed positions, i.e., the light shielding bodies 9T and 9B are in the positions indicated by 41a in FIGS. 4A and 41b in FIG. 4B, respectively. The curve 50 shows the simulation result for the turning mechanism 9a in the shape of FIG. 3A, and the curve 51 shows the simulation result for the turning mechanism 9a in the shape of FIG. 3B. As shown in FIG. 5, the curve 51 starts to rise earlier than the curve 50 with a low relative percentage of the amount of light and reaches 100% of the relative percentage of the amount of light at the turning angle of approximately 75 degrees. Because of its narrower operating angle range, the shape of FIG. 3B allows highly responsive control as compared with the shape of FIG. 3A. It can also be seen from the curves 50 and 51 that, except where the relative percentage of the amount of light is low, the rate of change in the relative percentage of the amount of light with respect to the turning angle is approximately the same. From this, as will be described later with FIG. 14, in the case of a low relative percentage of the amount of light, unevenness of illumination can be reduced by bending the end portions of the light shielding bodies 9T and 9B into a V shape in the direction of the radius of turning. It can also be seen from FIG. 5 that the light shielding bodies 9T and 9B each having the two cuts 9g at the tip as shown in FIGS. 3A and 3B allow continuous light amount control. While, in this preferred embodiment of the invention, the angles γT and γB are set to 20 degrees, they may be of any degree, and the same effect can be achieved without satisfying γT=γB. The relationship between the turning angle of the turning mechanism 9a and the relative percentage of the amount of light on the light valve 2, shown in the preferred embodiment of the invention, is for the case where input is a signal representing 100% of the relative percentage of the amount of light, so that only the property of the turning mechanism 9a is represented.

Figure 6A:
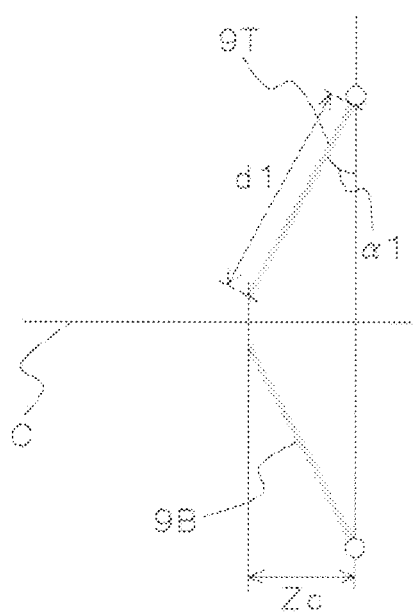
FIGS. 6A and 6B show the z-direction position of the tip of the turning mechanism when the relative percentage of the amount of light is 20% according to the first preferred embodiment of the invention.
Figure 6B:
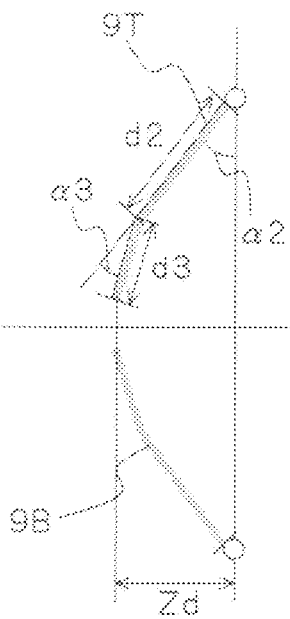

FIGS. 6A and 6B show the positions of the tips of the light shielding bodies 9T and 9B in the z direction when the relative percentage of the amount of light is 20% in FIG. 5. As shown in FIG. 6A, the turning angle in the case of the shape of FIG. 3A is approximately 24 degrees, i.e., α1≈24, while the turning angle in the case of the shape of FIG. 3B is approximately 34 degrees, i.e., α2≈34. The angle α3 in FIG. 6B is equal to γT and shall be 20 degrees. Let d1 be the length of the light shielding bodies 9T and 9B of FIG. 6A; d2 be the length of the light shielding bodies 9T and 9B of FIG. 6B from the turning axis to their bend; and d3 be the length of the light shielding bodies 9T and 9B of FIG. 6B from their bends to tips. Based on the conditions described above, the positions of the tips of the light shielding bodies 9T and 9B in the shape of FIG. 3B in the z direction can be calculated.

From FIGS. 6A and 6B, the amounts of travel Zc and Zd of the light shielding bodies 9T and 9B in the z direction can be expressed by the following equations (1) and (2), respectively.

$$Zc = d1 \times \sin(\alpha 1) \quad (1)$$
$$\approx d1 \times 0.41$$

$$Zd = d2 \times \sin(\alpha 2) + d3 \times \sin(\alpha 2 - \alpha 3) \quad (2)$$
$$\approx d2 \times 0.56 + d3 \times 0.24$$

From FIG. 4B, d1 can be expressed by the following equation (3).

$$d1 = d2 \times \cos(\alpha 3) + d3 \quad (3)$$
$$\approx d2 \times 0.94 + d3$$

Thus, Zc can be expressed by the following equation (4), so that the condition Zc>Zd can be satisfied by equation (5).

$$Zc \approx d2 \times 0.39 + d3 \times 0.41 \quad (4)$$

$$1 > d2/d3 \quad (5)$$

Accordingly, by making the length d2 shorter than the length d3, the shape of FIG. 3B can reduce unevenness of illumination as compared with the shape of FIG. 3A. Since the distance of travel of the tips of the light shielding bodies 9T and 9B is not the only cause of unevenness of illumination, the condition of equation (5) should preferably be satisfied but it is not a necessity.

Figure 7:
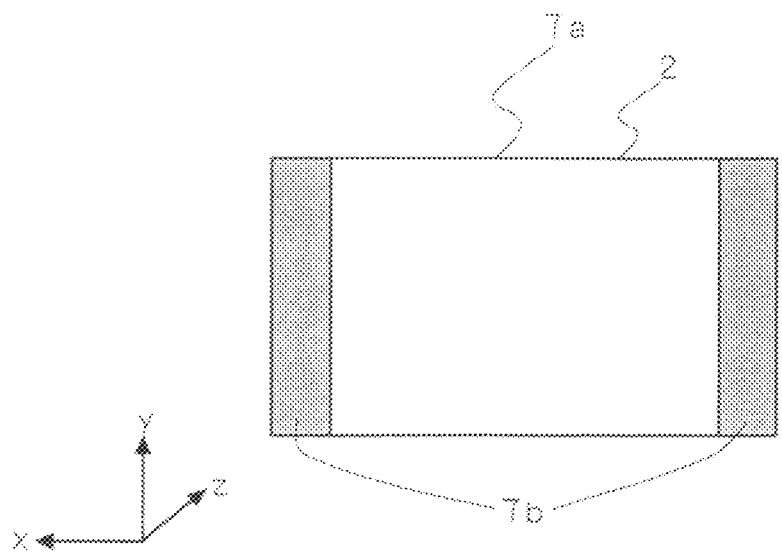
FIG. 7 shows an illumination distribution of light applied to a light valve when the turning mechanism in the shape of FIG. 3B provides complete light blocking according to the first preferred embodiment of the invention.

FIG. 7 shows the illumination distribution of light applied to the light valve 2 when the shape of FIG. 3B provides complete light blocking. In the case of complete light blocking, unevenness of illumination does not occur because light incident on the second lens array 4b is uniformly superimposed and applied onto the generally whole (area 7a) and around both x-direction end portions (areas 7b) of the light valve 2. The area 7a shows the illumination distribution of light applied from cells to the light valve 2 (area 30 in FIG. 3B) when the opening of the cells in the second lens array 4b is approximately full open, and the areas 7b show the illumination distribution of light applied from cells to the light valve 2 (areas 31 in FIG. 3B) when the opening of the cells in the second lens array 4b is approximately half opened.

Figure 8:
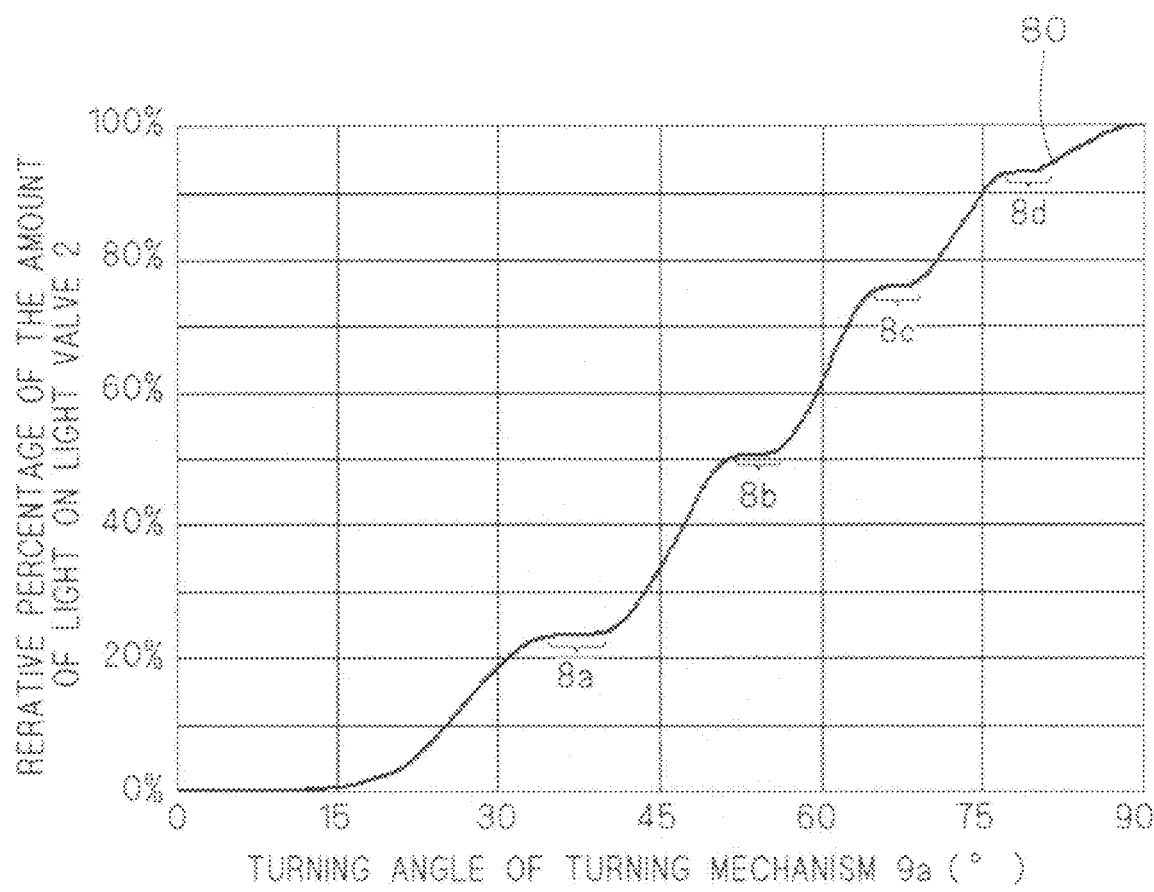
FIG. 8 shows the relationship between the turning angle and the relative percentage of the amount of light in the case where light shielding bodies have no cut according to the first preferred embodiment of the invention.

FIG. 8 shows the relationship between the turning angle and the relative percentage of the amount of light in the case where the light shielding bodies 9T and 9B with no bend have no cut. Simulation is conducted for every two degrees of the turning angle. It can be seen from the curve 80 that the rage of change in the relative percentage of the amount of light with respect to the turning angle is not continuous, and that the curve has four flat parts (8a, 8b, 8c, and 8d).

Figure 9:
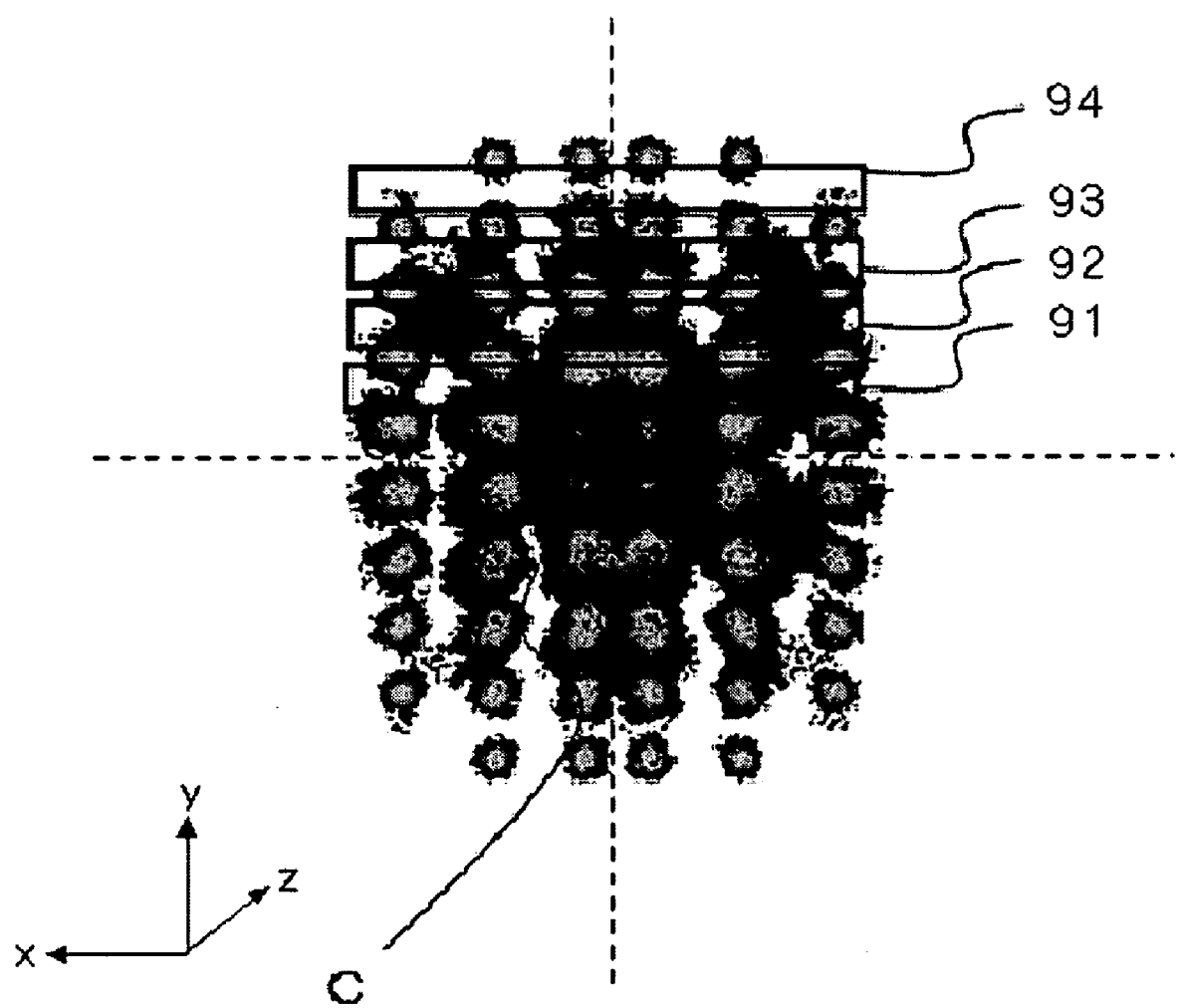
FIG. 9 shows light source images in the vicinity of a second lens array according to the first preferred embodiment of the invention.

FIG. 9 shows light source images in the vicinity of the second lens array 4b. FIG. 9 shows the images with 256 levels of gray scale. In FIG. 9, reference characters 91 to 94 designate a dark part between the light source images in the +y direction. The four flat parts 8a, 8b, 8c, and 8d in FIG. 8 correspond to the four dark parts 91, 92, 93, and 94 between the light source images in FIG. 9, which confirms that the dark parts between the light source images are the result of influence of the flat parts in FIG. 8. Thus, in order to provide a continuous change in the amount of light, it is necessary to simultaneously block light in both dark and light parts between the light source images. Since the light shielding bodies 9T and 9B with the cuts as shown in FIGS. 3A and 3B allow a continuous change in the amount of light as shown in FIG. 5, simultaneous light blocking in both dark and light parts between the light source images is made possible by forming cuts in the light shielding bodies 9T and 9B.

Figure 10:
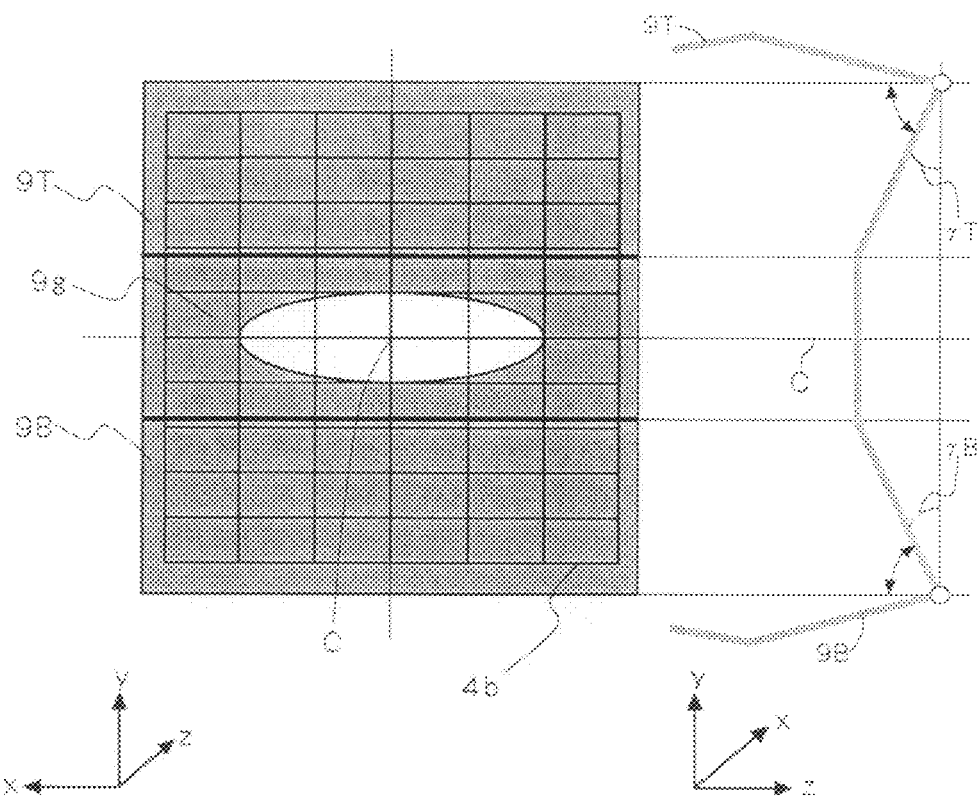
FIG. 10 shows an example of the shape of the turning mechanism according to the first preferred embodiment of the invention.

FIG. 10 shows an example of the shape of the light shielding bodies 9T and 9B, in which the light shielding bodies 9T and 9B each have a single cut 9g to have symmetry with respect to the optical axis C. When such a shape provides complete light blocking, an approximately uniform illumination distribution of light is given on the light valve 2.

Figure 11:
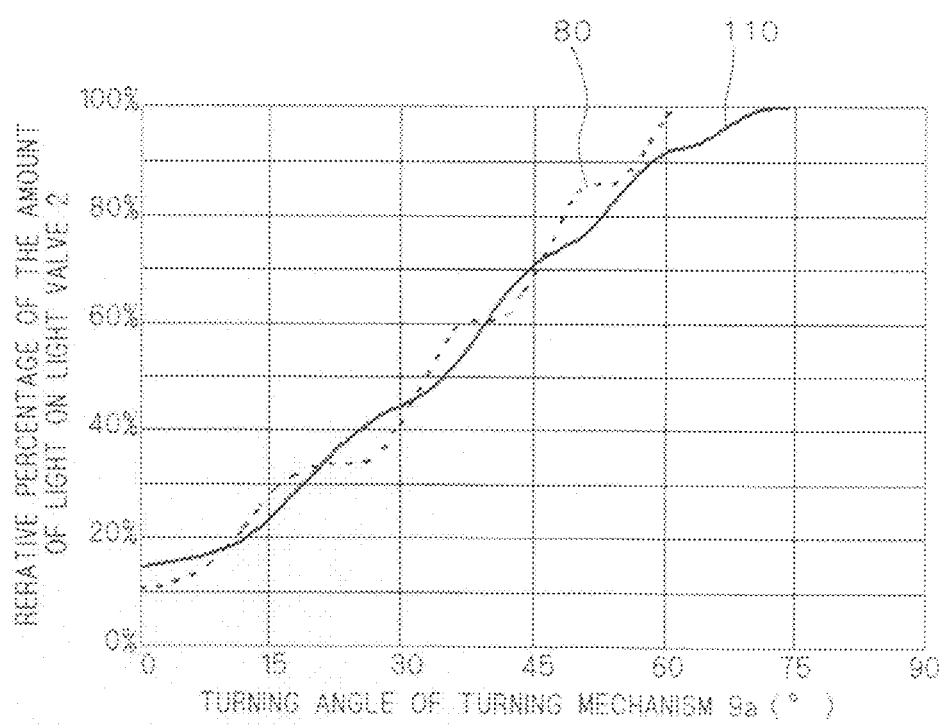
FIG. 11 shows the relationship between the turning angle and the relative percentage of the amount of light in the case where the turning mechanism is in the shape of FIG. 10 according to the first preferred embodiment of the invention.

FIG. 11 shows the relationship between the turning angle and the relative percentage of the amount of light in the case where the light shielding bodies 9T and 9B are in the shape of FIG. 10. In FIG. 10, the angles γT and γB of the light shielding bodies 9T and 9B shall be 20 degrees. The curve 110 shows the simulation result for the turning mechanism 9a in the shape of FIG. 10. The curve 80 shows the simulation result shown in FIG. 8 for the turning mechanism 9a with no cut, for comparison of the effect between the presence and absence of the cuts 9g. For ease of comparison, the curve 80 is shifted to overlap with the curve 110. It can be seen from FIG. 11 that even the light shielding bodies 9T and 9B with only one cut 9g can provide more continuous light amount control than the light shielding bodies 9T and 9B with no cut. In other words, forming at least one cut 9g in the light shielding bodies 9T and 9B is effective at achieving continuous light amount control. However, it can be seen from the curve 51 in FIG. 5 and the curve 110 in FIG. 11 that the light shielding plates 9T and 9B with two cuts produce a smoother change in the amount of light than those with only one cut. From this, it is more preferable to provide a plurality of cuts for smoother light amount control.

Figure 12:
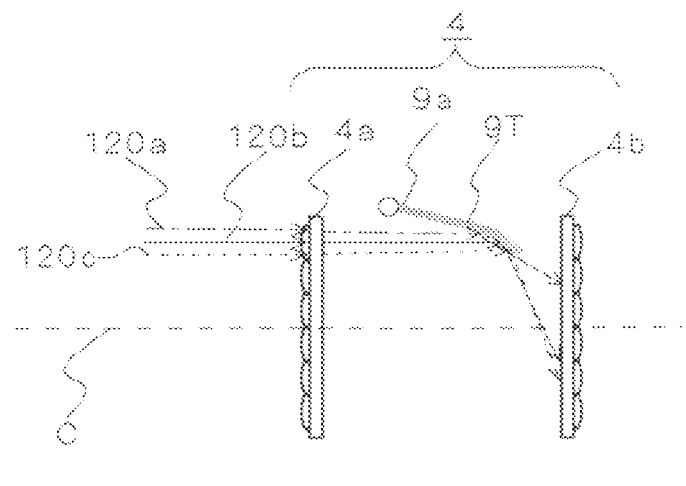
FIG. 12 shows the path of light with respect to the shape of the turning mechanism according to the first preferred embodiment of the invention.

FIG. 12 shows the paths of light when the light shielding bodies 9T and 9B turn toward the first lens array 4a at the time of light blocking, and especially shows the paths of light passing through the lens cell that is farthest in the +y direction in the first lens array 4a. Although only the light shielding body 9T is described here, the same applies to the light shielding body 9B. Reference character 120a designates the path of light passing through the +y side of the center of the lens cell; reference character 120b designates the path of light passing through the center of the lens cell; and reference character 120c designates the path of light passing through the −y side of the center of the lens cell. As shown in FIG. 12, when the light shielding body 9T is bent at a small angle or bent in a position that is far from the turning axis, unnecessary light reflected off the light shielding body 9T passes through the second lens array 4b and, after multipath reflection inside a housing (not shown) of the illumination optical system 1, it may appear on a screen. From this, the light shielding bodies 9T and 9B turning toward the second lens array 4b at the time of light blocking are more preferable than the light shielding bodies 9T and 9B that open and close in the direction as shown in FIG. 12.

Figures 13A, 13B:
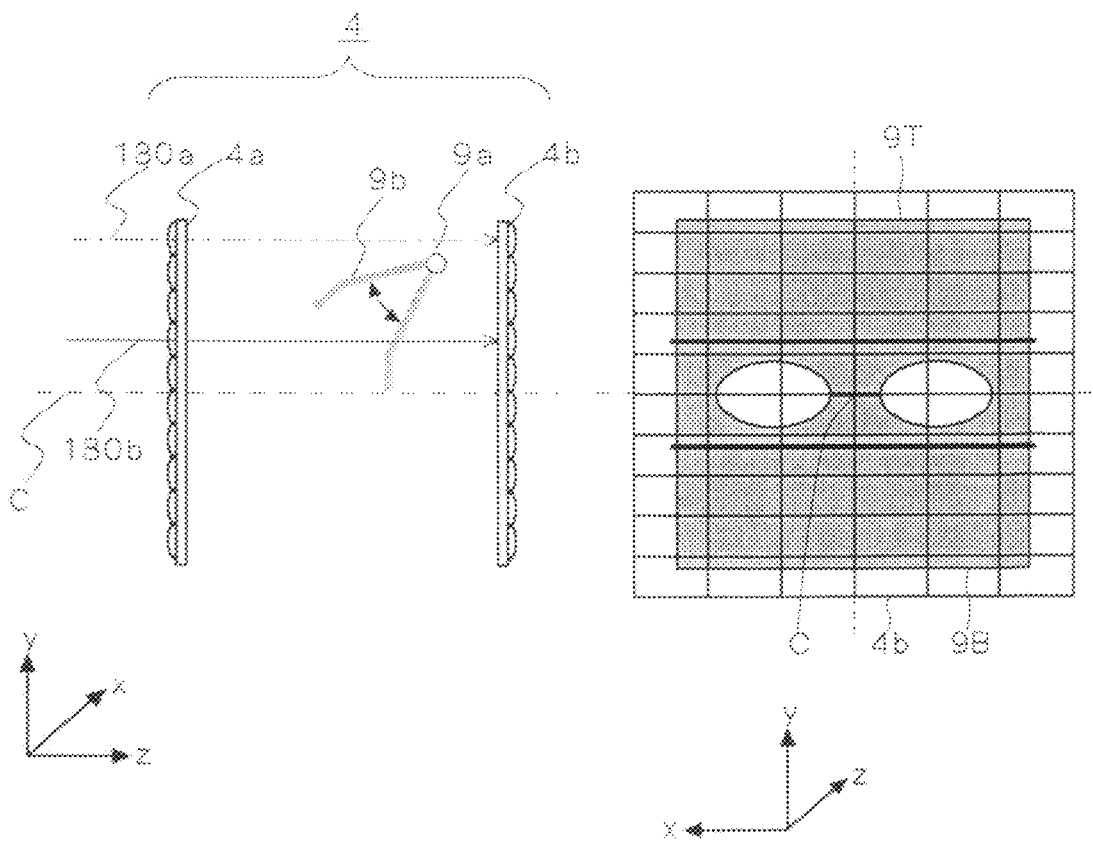
FIGS. 13A and 13B show the paths of light when the turning mechanism has a smaller dimension than the lens arrays according to the first preferred embodiment of the invention.

FIG. 13A shows the paths of light when the light shielding bodies 9T and 9B are smaller in x- and y-direction dimensions than the first lens array 4a and the second lens array 4b. FIG. 13B shows a comparison of the x- and y-direction dimensions between the light shielding bodies 9T and 9B and the second lens array 4b, from which it can be seen that the light shielding bodies 9T and 9B have smaller x- and y-direction dimensions than the second lens array 4b. Although only the light shielding body 9T is described here, the same applies to the light shielding body 9B. Reference character 130a designates the path of light passing through the center of the lens cell that is the fifth one in the +y direction from the optical axis C in the first lens array 4a; and reference character 130b designates the path of light passing through the +x side of the center of the lens cell that is the second one in the +y direction and the third one in the +x direction from the optical axis C in the first lens array 4a. It can be seen from FIG. 13A that light passing through those cells which are on the +y side of the turning axes of the light shielding bodies 9T and 9B in the first lens array 4a passes through the +y side without entering the light shielding bodies 9T and 9B. Thus, in order to control the amount of light emitted from the first lens array 4a using the light shielding bodies 9T and 9B, the light shielding bodies 9T and 9B should preferably have larger x- and y-direction dimensions than the first lens array 4a and the second lens array 4b. In the case where the second lens array 4b is larger in dimension than the first lens array 4a, although it is preferable that the light shielding bodies 9T and 9B should have larger x- and y-direction dimensions than the second lens array 4b, it is also possible to block unnecessary light passing through the second lens array 4b by providing a light shielding plate between the second lens array 4b and the polarization conversion element 5. From this, it can be said that the light shielding bodies 9T and 9B are not necessarily larger in x- and y-direction dimensions than the first lens array 4a and the second lens array 4b.

Figure 14:
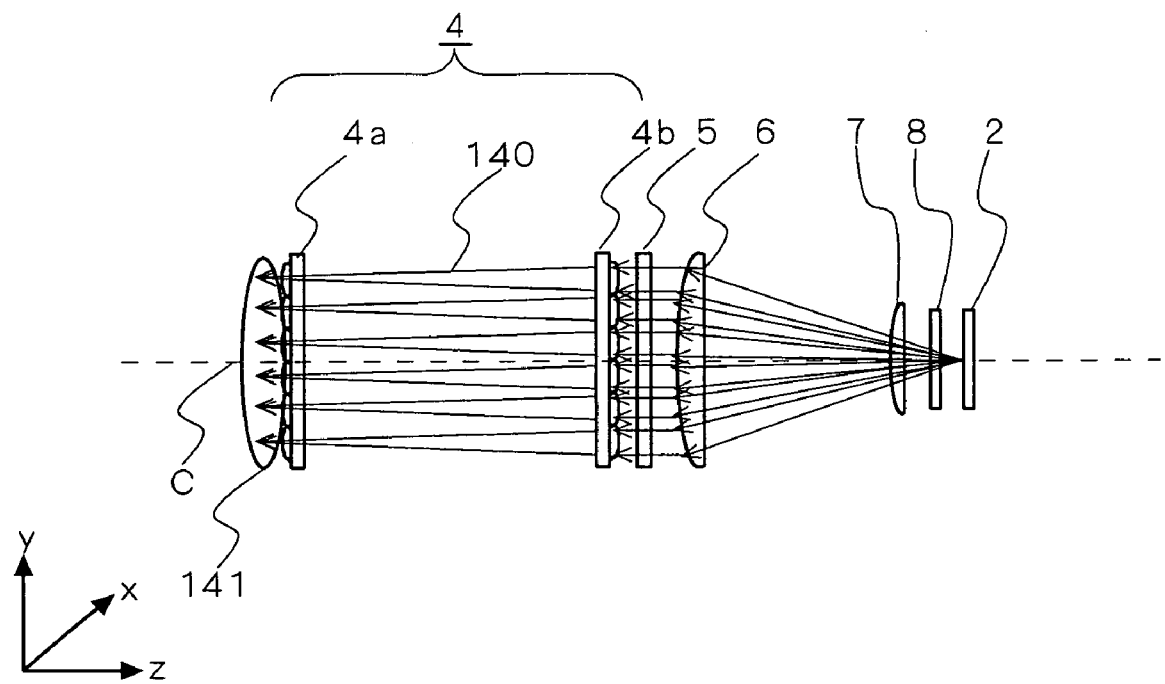
FIG. 14 shows the paths of light when reverse ray tracing is performed from the center of the light valve according to the first preferred embodiment of the invention.

FIG. 14 shows the paths of light calculated by reverse ray tracing from the center of the light valve 2. Reference character 140 designates the paths of light; and reference character 141 designates the area where the paths of light indicated by 140 are concentrated. Since it can be seen from FIG. 14 that an image in the vicinity of the first lens array 4a is formed on the light valve 2, the light valve 2 and the neighborhood of the light incident surface of the first lens array 4a are in conjugation. Thus, when the tips of the light shielding bodies 9T and 9B are in the vicinity of the area 141, the tips of the light shielding bodies 9T and 9B are imaged onto the light valve 2, which undesirably causes linear unevenness of illumination in the x direction in the vicinity of the center on the light valve 2. Therefore, it is preferable that the tips of the light shielding bodies 9T and 9B are brought close to the second lens array 4b, i.e., the turning axes are in the vicinity of the second lens array 4b.

Focusing on the tips of the light shielding bodies 9T and 9B, since the light shielding bodies 9T and 9B bent into a V shape in a direction to reduce the amount of light (to block the light) are imaged with a narrower width in the y direction than the light shielding bodies 9T and 9B with no bend (cf. dy1 in FIG. 15B and dy2 in FIG. 16B), they can reduce unevenness of illumination on the light valve 2. Therefore, it can be said that unevenness of illumination on the light valve 2 can be reduced by bending the light shielding bodies 9T and 9B into a V shape in a direction to reduce the amount of light (to block the light).

FIGS. 15A and 15B and FIGS. 16A and 16B show the turning positions of the light shielding bodies 9T and 9B in the shapes of FIGS. 3A and 3B when the tips of the light shielding bodies 9T and 9B are imaged on the light valve 2. The condition that an image is formed on the light valve 2 is that the tips of the light shielding bodies 9T and 9B are in the vicinity of the first lens array 4a and in positions that are equivalent to the centers of the curvatures of the lens cells that are the second ones in the +y and −y directions from the optical axis C in the second lens array 4b. Reference characters 150, 151, 160, and 161 designate the axis passing through the center of the curvature of the lens cell that is the second one in the +y or −y direction from the optical axis C in the second lens array 4b; and reference characters 152 and 162 designate the tip of the light shielding body 9T.

Now we describe the reason why the tips of the light shielding bodies 9T and 9B should be in the positions equivalent to the centers of the curvatures of the lens cells that are the second ones in the +y and −y directions from the optical axis C in the second lens array 4b. First of all, in positions that are equivalent to the centers of the curvatures of the lens cells that are the first ones in the +y and −y directions from the optical axis C in the second lens array 4b, it is difficult to check unevenness of illumination on the light valve 2 due to low illumination. In positions that are equivalent to the centers of the curvatures of the lens cells that are the third ones in the +y and −y directions from the optical axis in the second lens array 4b, light with illumination uniformity is superimposed on the light valve 2 from the lens cells that are the first ones in the +y and −y directions from the optical axis C and from the lens cells that are the second ones in the +y and −y directions from the optical axis C, which relatively reduces unevenness of illumination on the light valve 2 and thus makes it difficult to check unevenness of illumination caused by the lens cells that are the third ones in the +y and −y directions from the optical axis C. Accordingly, as a condition that allows the easy checking of imaging of the tips of the light shielding bodies 9T and 9B on the light valve 2, the tips of the light shielding bodies 9T and 9B should be in the positions equivalent to the centers of the curvatures of the lens cells that are the second ones in the +y and −y directions from the optical axis C in the second lens array 4b.

Figure 15A:
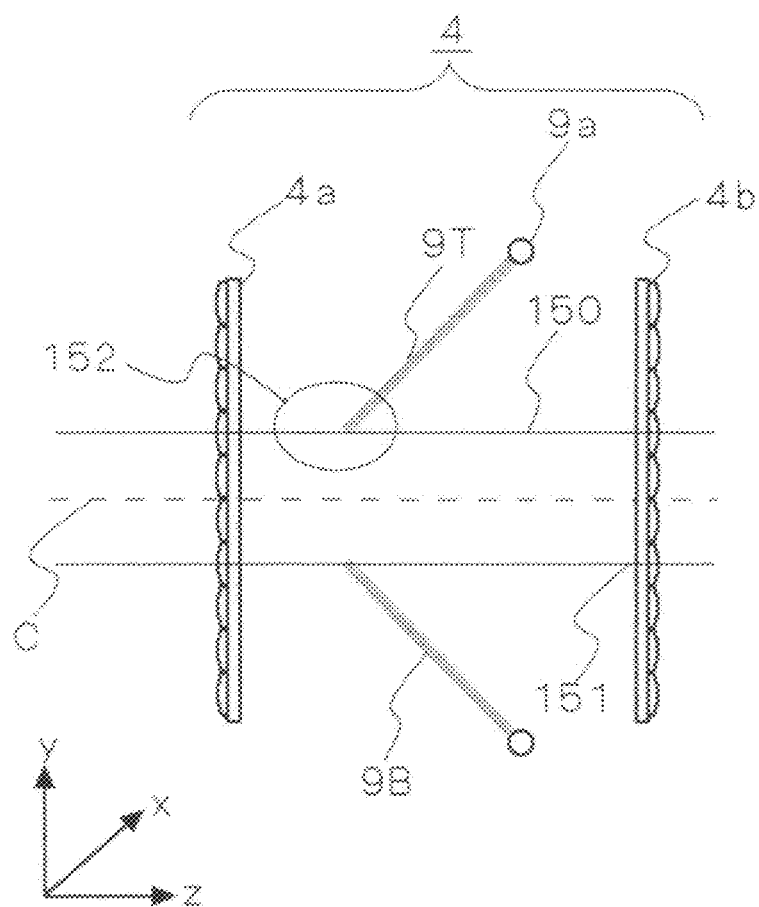
FIGS. 15A and 15B show the turning position of the turning mechanism when imaged on the light valve according to the first preferred embodiment of the invention.
Figure 15B:
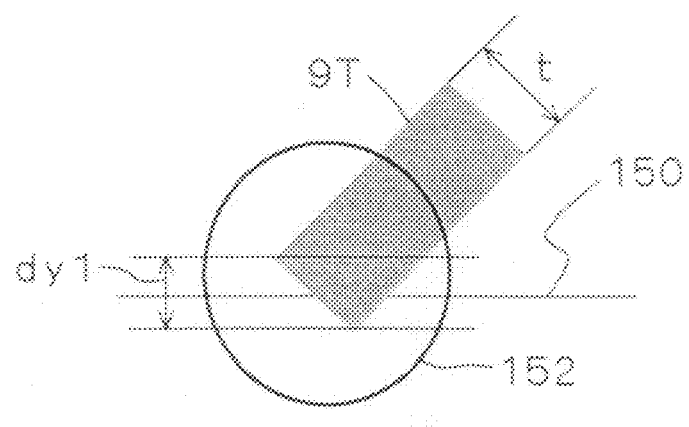
Figure 16A:
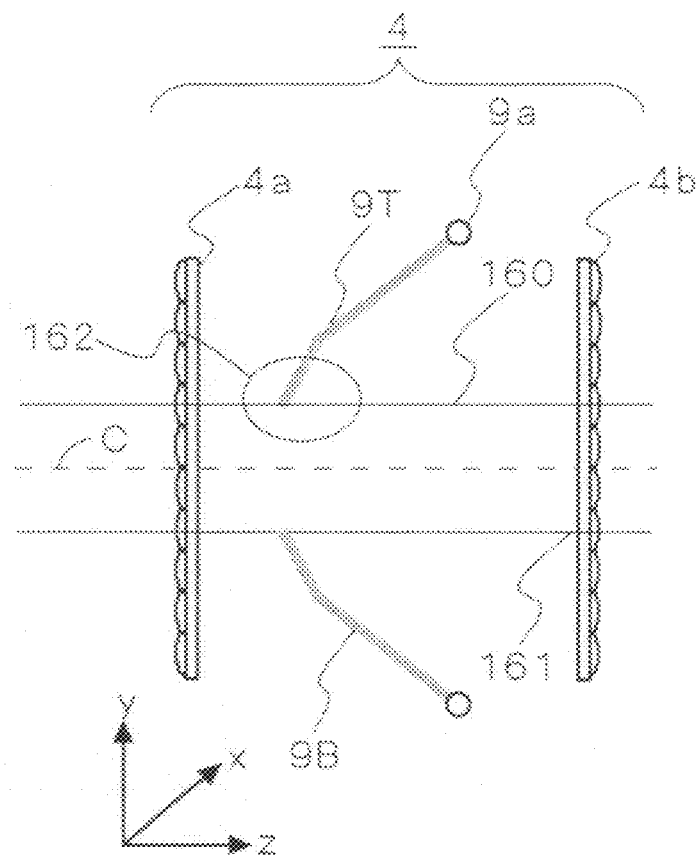
FIGS. 16A and 16B show the turning position of the turning mechanism when imaged on the light valve according to the first preferred embodiment of the invention.
Figure 16B:
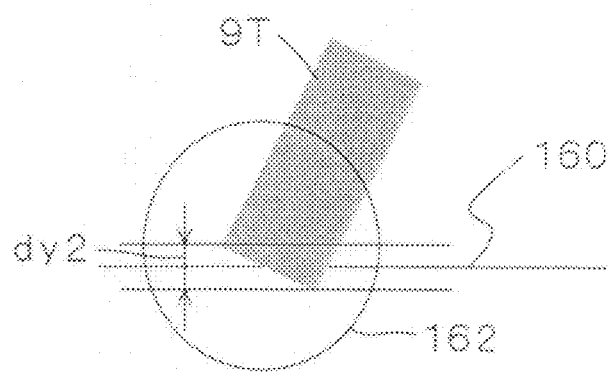
Figure 17A:
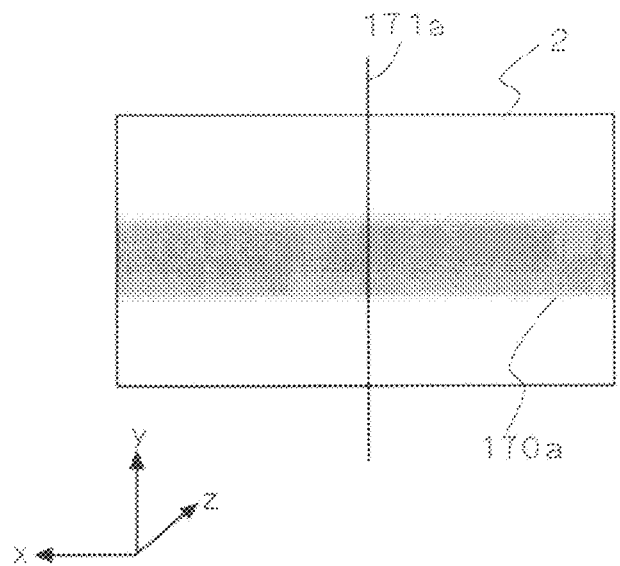
FIGS. 17A and 17B show illumination distributions of light applied to the light valve according to the first preferred embodiment of the invention.
Figure 17B:
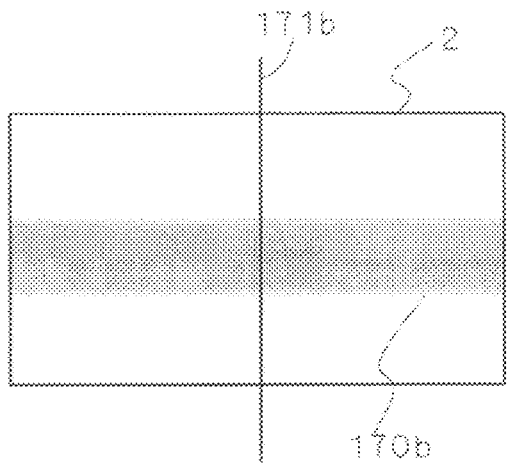

FIG. 17A shows the simulation result of the illumination distribution on the light valve 2 when the light shielding bodies 9T and 9B have not such a cut 9g as shown in FIG. 3A and are in the condition of FIGS. 15A and 15B; and FIG. 17B shows the simulation result of the illumination distribution on the light valve 2 when the light shielding bodies 9T and 9B have no such a cut 9g as shown in FIG. 3B and are in the condition of FIGS. 16A and 16B. In FIGS. 17A and 17B, reference characters 170a and 170b designate the area with low illumination; and reference characters 171a and 171b designate the y axis passing through the center of the light valve 2. The comparison of the areas 170a and 170b shows that the area 170b has higher illumination uniformity than the area 170a. This is because there is the inequality relation dy1>dy2 between the width dy1 of FIG. 15B and the width dy2 of FIG. 16B. Accordingly, unevenness of illumination on the light valve 2 can be reduced by bending the light shielding bodies 9T and 9B into a V shape in a direction to reduce the amount of light (to block the light). From this, it can be said that, without satisfying the aforementioned condition of equation (5), the light shielding bodies 9T and 9B with bends can reduce unevenness of illumination.

Figure 18:
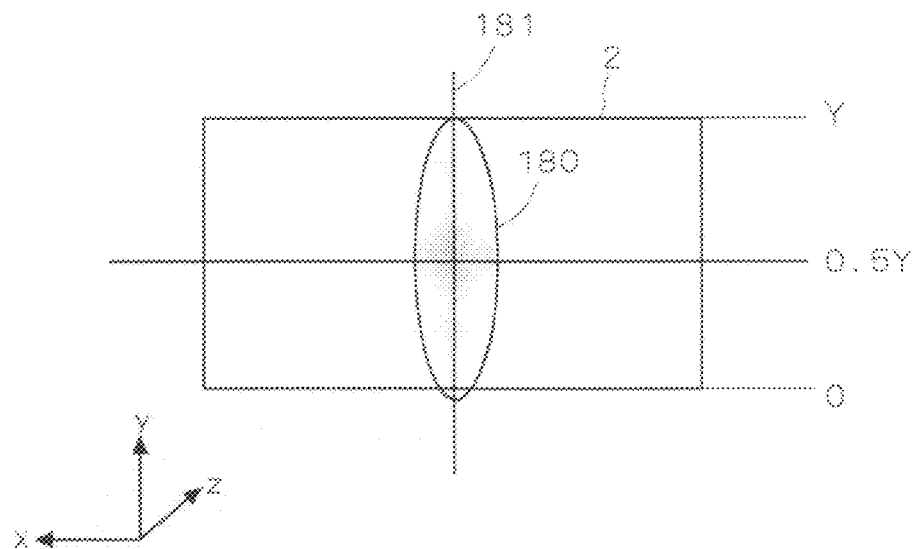
FIG. 18 shows an illumination distribution of light applied to the light valve according to the first preferred embodiment of the invention.

FIG. 18 shows the simulation result of the illumination distribution on the light valve 2 when the light shielding bodies 9T and 9B are in the shape of FIG. 3B and in the condition of FIGS. 16A and 16B. As shown in FIG. 18, there is little area with low illumination in the x direction from the center of the light valve 2. Reference character 180 designates the area with low illumination in y direction extending from the center of the light valve 2; and reference character 181 designates the y axis passing through the center of the light valve 2. Although there is only some slight unevenness of illumination in the area 180 because of the cuts 9g in the light shielding bodies 9T and 9B forming the light gathering places in the second lens array 4b, this is not a problem because the whole illumination distribution of the light valve 2 is approximately uniform. Accordingly, superimposition of the tips imaged on the light valve 2 can be reduced by bending the light shielding bodies 9T and 9B into a V shape in a direction to reduce the amount of light (to block the light); by forming at least one cut at the tips of the light shielding bodies 9T and 9B; and further by reducing flat parts of those tips other than the cuts. This results in a considerable reduction of unevenness of illumination.

Figure 19:
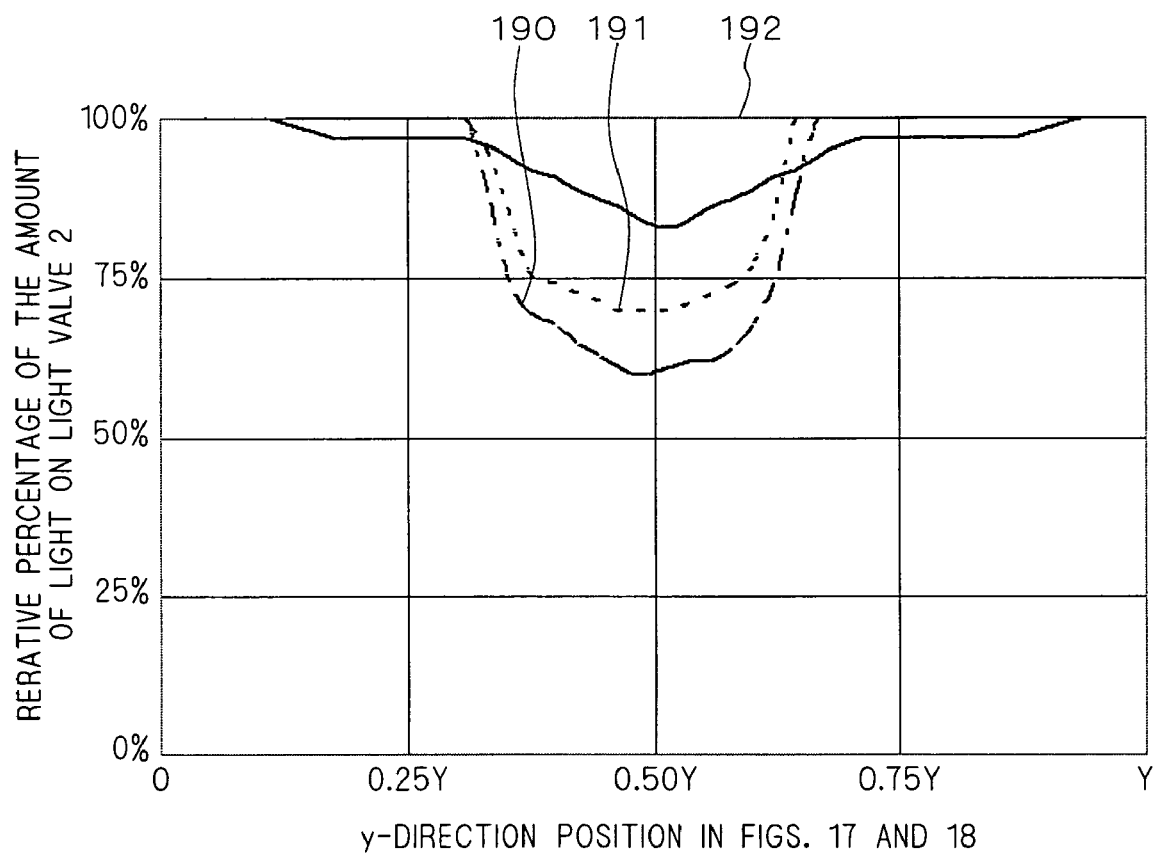
FIG. 19 shows the relative percentage of the amount of light on y axes of FIGS. 17A, 17B, and 18 according to the first preferred embodiment of the invention.

FIG. 19 shows the relative percentage of the amount of light in the y direction on the y axes 171a, 171b, and 181 shown in FIGS. 17A and 17B and FIG. 18, respectively. The horizontal axis corresponds to the vertical axis on the light valve 2 shown in FIG. 18. In FIG. 19, reference character 190 designates the relative percentage of the amount of light on the y axis 171a; reference character 191 designates the relative percentage of the amount of light on the y axis 171b; and reference character 192 designates the relative percentage of the amount of light on the y axis 181. Referring to FIG. 19, comparison of the values of the relative percentage of the amount of light at 0.50Y, which is the y-direction center of the light valve 2, yields the inequality 190<191<192 and shows that unevenness of illumination decreases in the order of 190, 191, and 192. This indicates that unevenness of illumination can be reduced by forming the light shielding bodies 9T and 9B with V-shaped bends in a direction to reduce the amount of light (to block the light) and with cuts at the tips.

While this preferred embodiment has described the case where γT=α2=α3 in FIG. 6B when the light shielding bodies 9T and 9B are in the position 41b shown in FIG. 4B, the width dy2 in FIG. 16B can further be reduced in the case where α3>α2=γT, in which case unevenness of illumination can further be reduced than in the case of the shape of FIG. 4B. Further, while the light shielding bodies 9T and 9B each have only one bend, they may have two bends if the width dy2 in FIG. 16B can further be reduced. By so doing, unevenness of illumination can further be reduced. While the light shielding bodies 9T and 9B in FIG. 3B are bent in the vicinity of the lens cell that is the second one in the y direction from the optical axis C as a center in the second lens array 4b, they may be bent in any position.

From the above description, it is clear that continuous light amount control without causing unevenness of illumination on the light valve 2 can be achieved by forming the light shielding bodies 9T and 9B in the turning mechanism 9a with a V-shaped bend in a direction to reduce the amount of light (to block the light) and with at least one cut at their tips.

Second Preferred Embodiment

Figure 20:
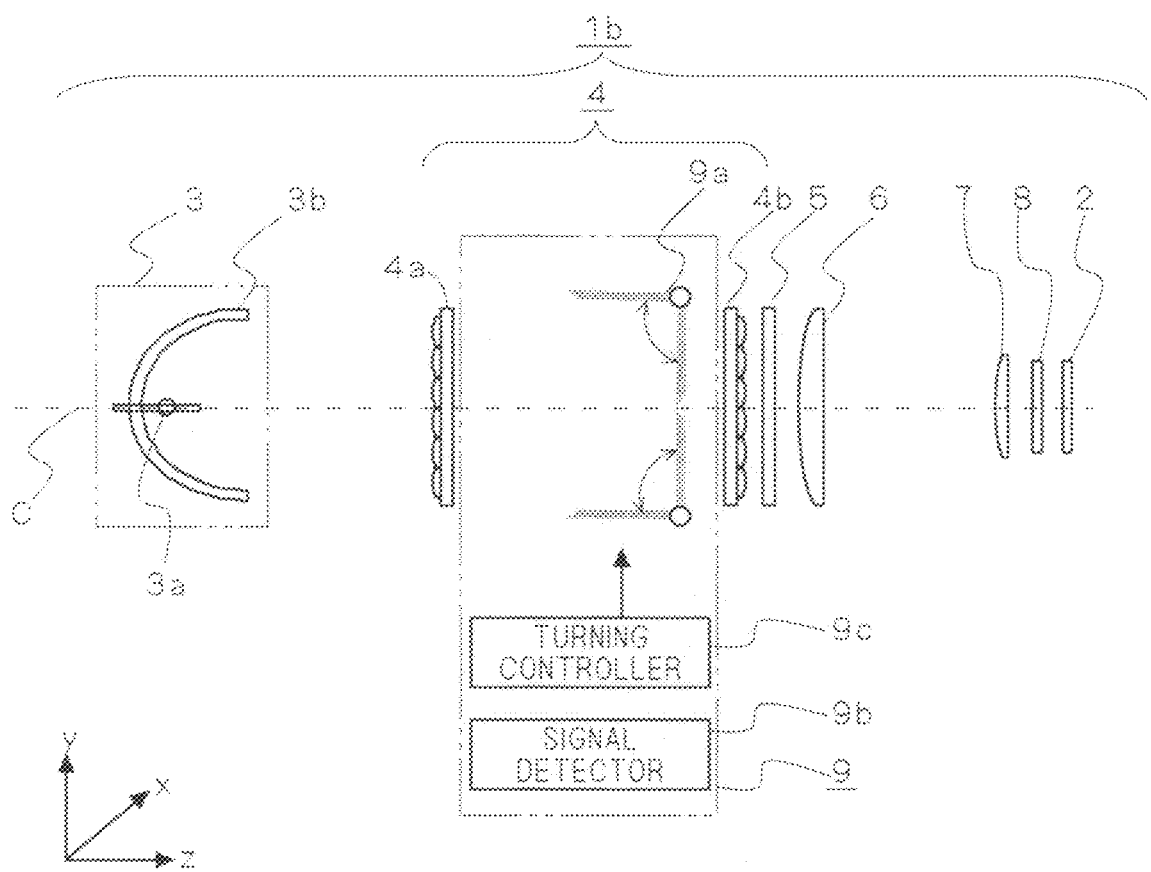
FIG. 20 is a block diagram of an illumination optical system in a projection display according to a second preferred embodiment of the invention.

FIG. 20 is a block diagram of an illumination optical system 1b in a projection display according to a second preferred embodiment of the invention. The second preferred embodiment of the invention is characterized in that the light shielding bodies 9T and 9B in the turning mechanism 9a have a sharp edged tip. The other parts of the configuration and the operation are identical to those described in the first preferred embodiment and thus not described here.

Figure 22A:
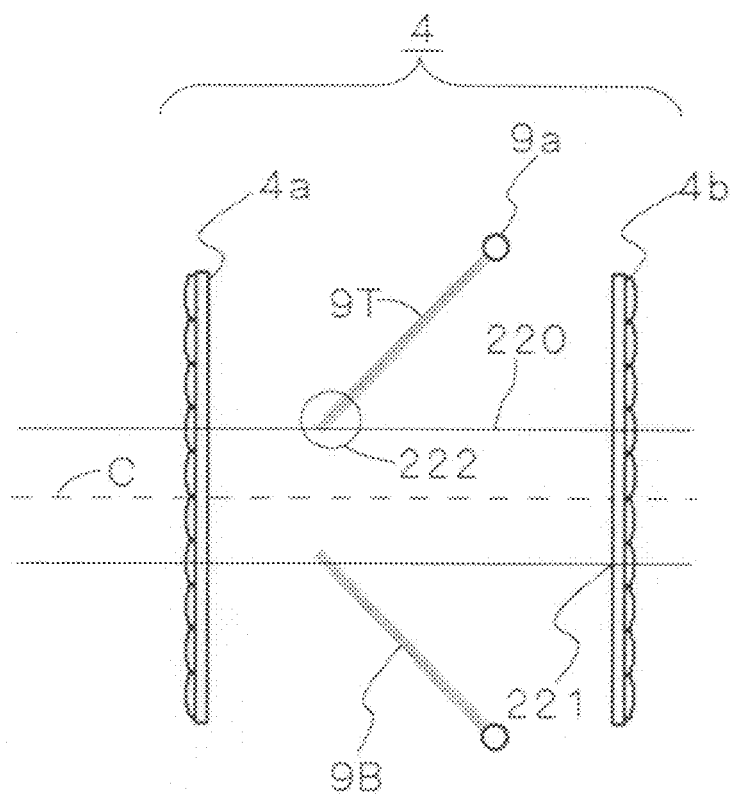
FIGS. 22A and 22B show the turning position of the turning mechanism when imaged on the light valve according to the second preferred embodiment of the invention.
Figure 22B:
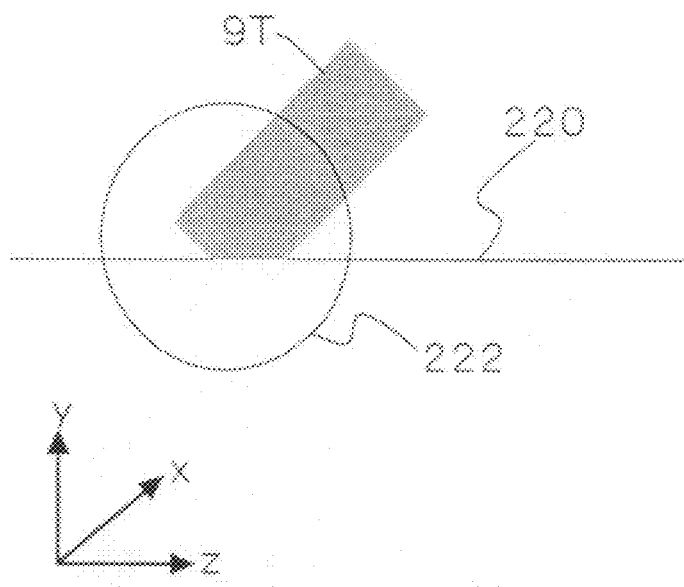

FIGS. 21A and 21B are the same drawings as FIGS. 15A and 15B; and FIGS. 22A and 22B are similar to FIGS. 15A and 15B in the positions of the light shielding bodies 9T and 9B. Reference characters 210, 211, 220, and 221 designate the axis passing through the center of the curvature of a lens cell that is the second one in the +y or −y direction from the optical axis C in the second lens array 4b. As shown in FIGS. 22A and 22B, the light shielding bodies 9T and 9B on the optical axis C side of the axis 220 have a sharp edged tip. By so doing, the widths of the tips are reduced by dy. The width t of the light shielding bodies 9T and 9B is in general approximately 0.5 mm in consideration of the intensity of the light shielding bodies 9T and 9B with respect to the turning of the turning mechanism 9a. Reference characters 212 and 222 designate the tip of the light shielding body 9T.

Figure 23A:
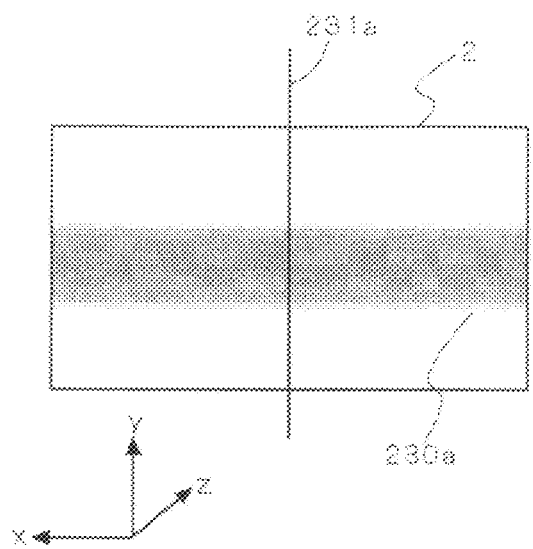
FIGS. 23A and 23B show illumination distributions of light applied to the light valve according to the second preferred embodiment of the invention.
Figure 23B:
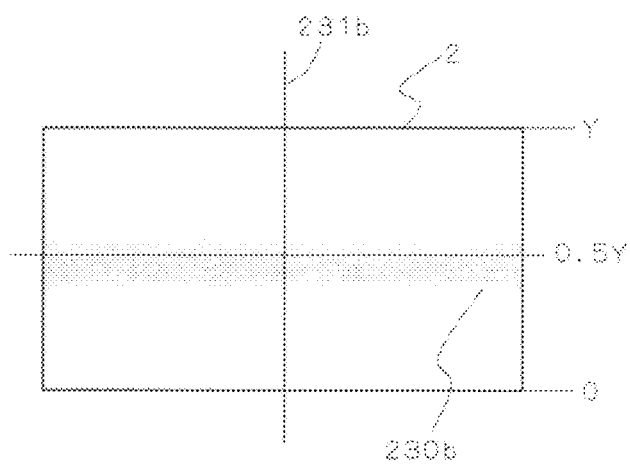

FIG. 23A shows the simulation result of the illumination distribution on the light valve 2 when the light shielding bodies 9T and 9B have no such a cut 9g as shown in FIG. 3A and are in the condition of FIGS. 21A and 21B; and FIG. 23B shows the simulation result of the illumination distribution on the light valve 2 when the light shielding bodies 9T and 9B have no such a cut 9g as shown in FIG. 3A and are in the condition of FIGS. 22A and 22B. It is assumed that t=0.55 mm. In FIGS. 23A and 23B, reference characters 230 and 230b designate the area with low illumination; and reference characters 231a and 231b designate the y axis passing through the center of the light valve 2. Comparison of the areas 230a and 230b shows that unevenness of illumination in the area 230b is considerably improved. Accordingly, as shown in FIGS. 22A and 22B, unevenness of illumination can considerably be reduced by sharply edging the tips of the light shielding bodies 9T and 9B on the optical axis C side of the axes passing through the centers of the curvatures of the lens cells that are the second ones in the +y and −y directions from the optical axis C in the second lens array 4b.

Figure 24:
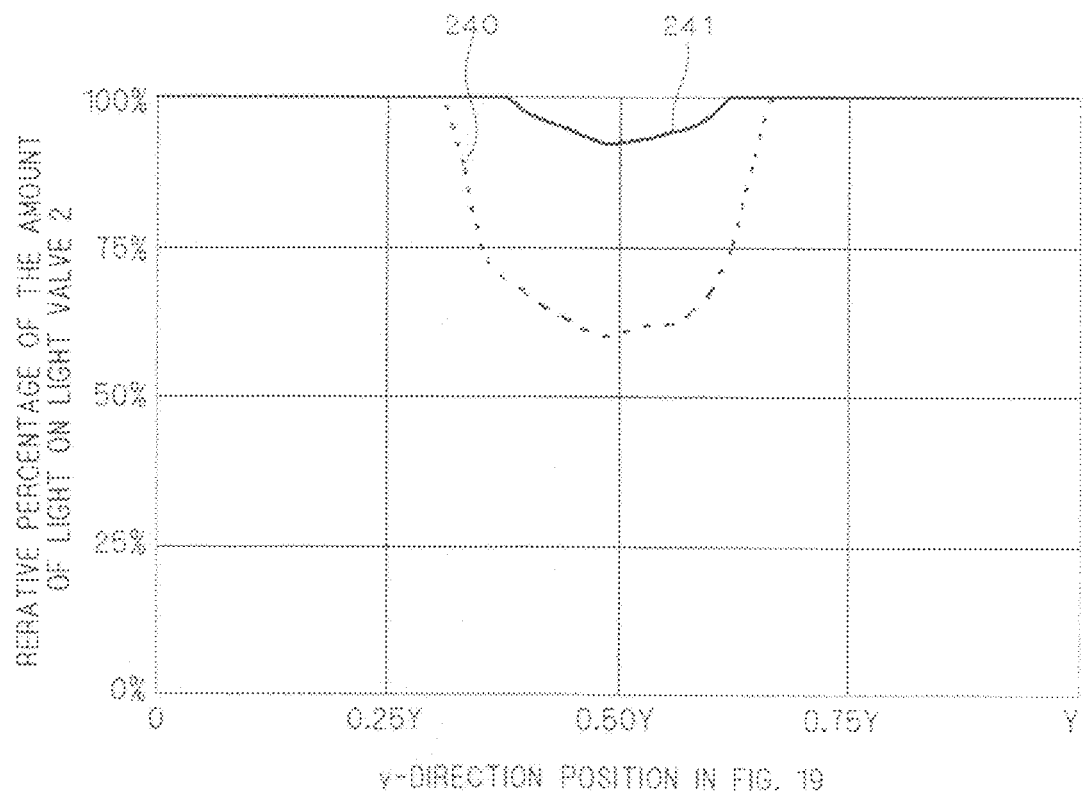
FIG. 24 shows the relative percentage of the amount of light on y axes of FIGS. 23A and 23B according to the second preferred embodiment of the invention.

FIG. 24 shows the relative percentage of the amount of light in the y direction on the y axes 231a and 231b shown in FIGS. 23A and 23B, respectively. In FIG. 24, reference character 240 designates the relative percentage of the amount of light on the y axis 231a; and reference character 241 designates the relative percentage of the amount of light on the y axis 231b. Referring to FIG. 24, comparison of the values of the relative percentage of the amount of light at 0.50Y, which is the y-direction center of the light valve 2, shows that the relative percentage indicated by 241 is higher than the relative percentage indicated by 240, i.e., unevenness of illumination is considerably reduced. This indicates that unevenness of illumination can considerably be reduced by sharply edging the tips of the light shielding bodies 9T and 9B on the optical axis C side of the axes passing through the centers of the curvatures of the lens cells that are the second ones in the +y and −y directions from the optical axis C in the second lens array 4b.

Figure 25A:
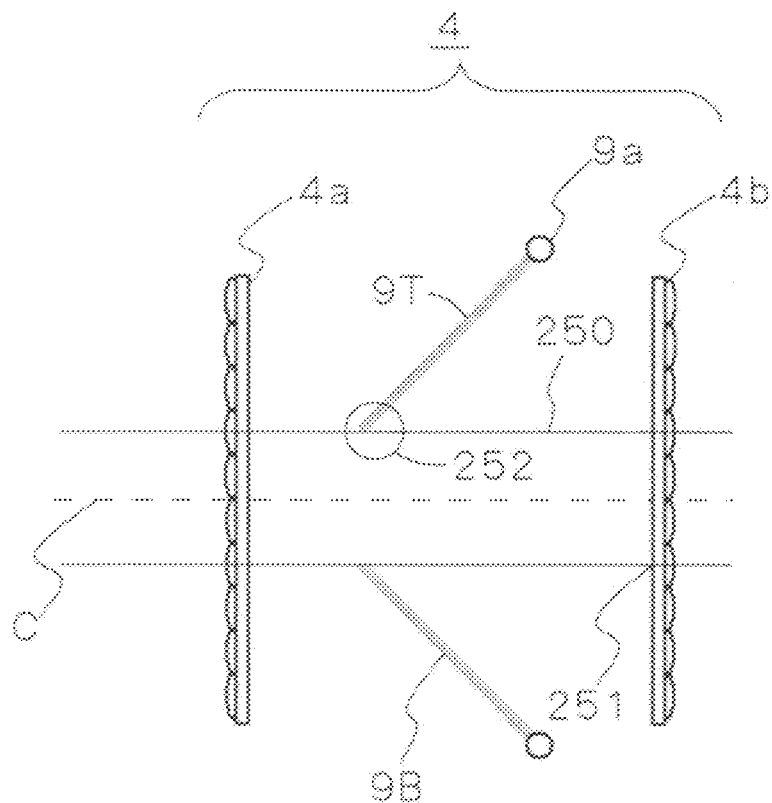
FIGS. 25A and 25B show the shape of the tip of the turning mechanism according to the second preferred embodiment of the invention.
Figure 25B:
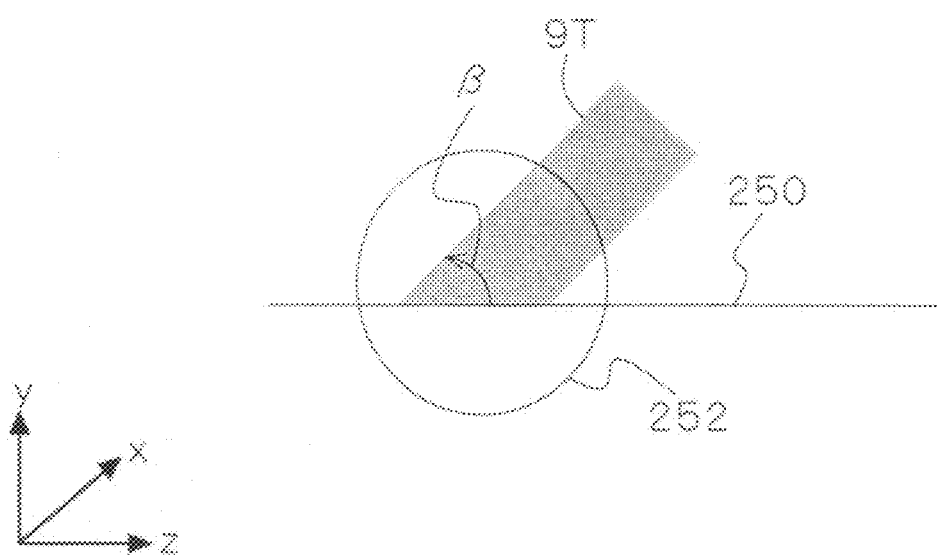

FIGS. 25A and 25B shows the shape of the tips of the light shielding bodies 9T and 9B. Reference characters 250 and 251 designate the axis passing through the center of the curvature of a lens cell that are the second one in the +y or −y direction from the optical axis C in the second lens array 4b. It can be seen from FIGS. 25A and 25B that the angles at the tips of the light shielding bodies 9T and 9B should preferably be smaller than β.

From the above description, it is clear that continuous light amount control without causing unevenness of illumination on the light valve 2 can be achieved by forming at least one cut at the tips of the light shielding bodies 9T and 9B and further by sharply edging the tips of the light shielding bodies 9T and 9B.

Third Preferred Embodiment

Figure 26:
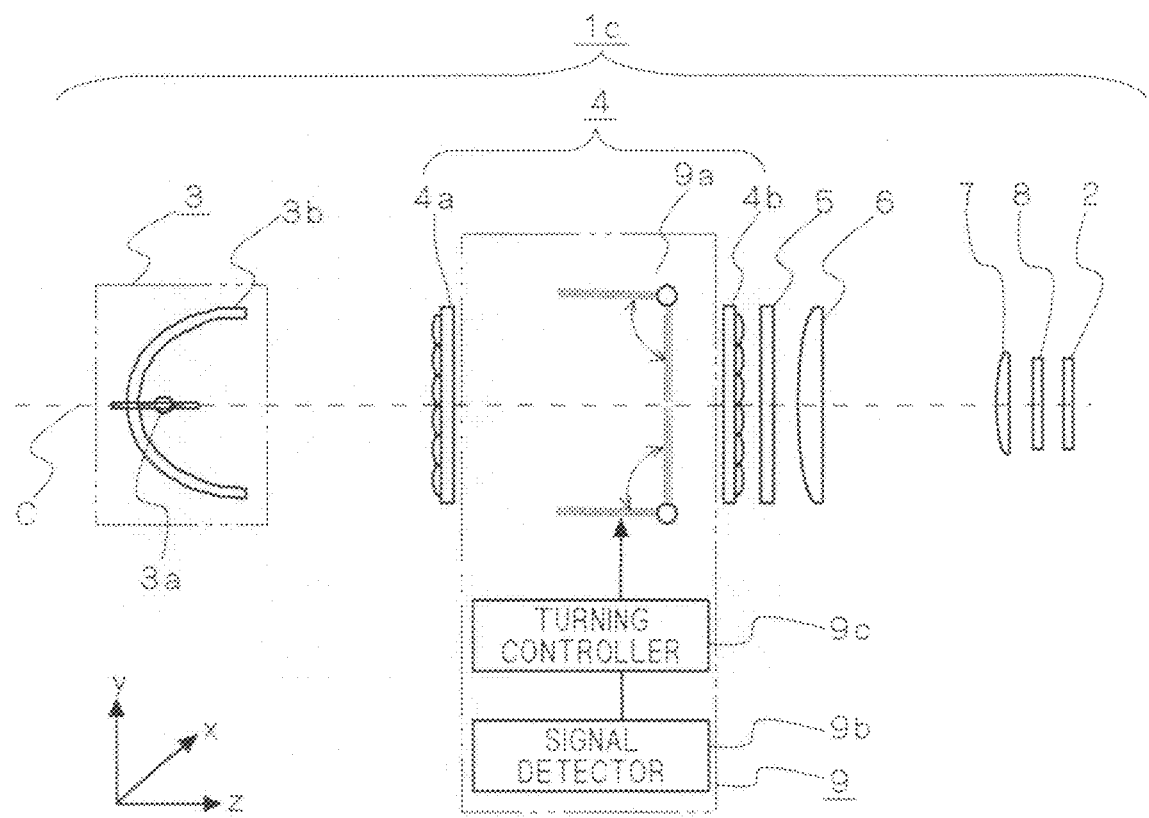
FIG. 26 is a block diagram of an illumination optical system in a projection display according to a third preferred embodiment of the invention.
Figure 27:
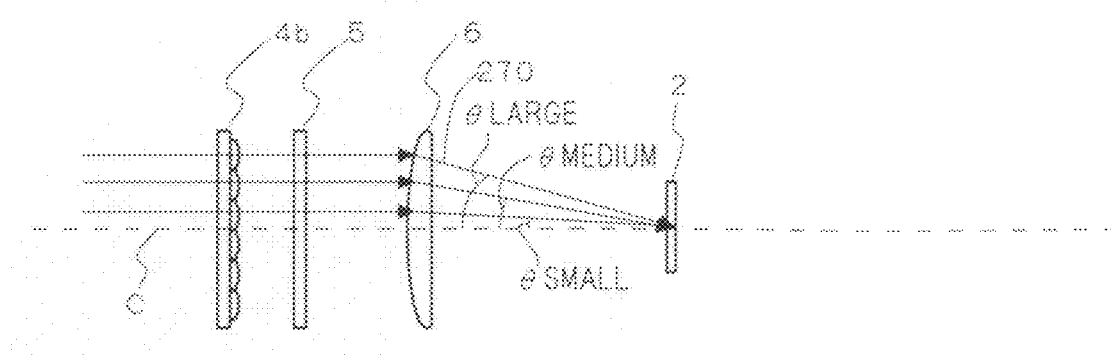
FIG. 27 shows the paths of light incident on the light valve according to the third preferred embodiment of the invention.

FIG. 26 is a block diagram of an illumination optical system 1c in a projection display according to a third preferred embodiment of the invention. The third preferred embodiment of the invention is characterized in that the light shielding bodies 9T and 9B with small opening areas at their tips can achieve sufficiently high contrast without causing unevenness of illumination on the light valve 2. The other parts of the configuration and the operation are identical to those described in the first preferred embodiment and thus not described here.

Figure 29:
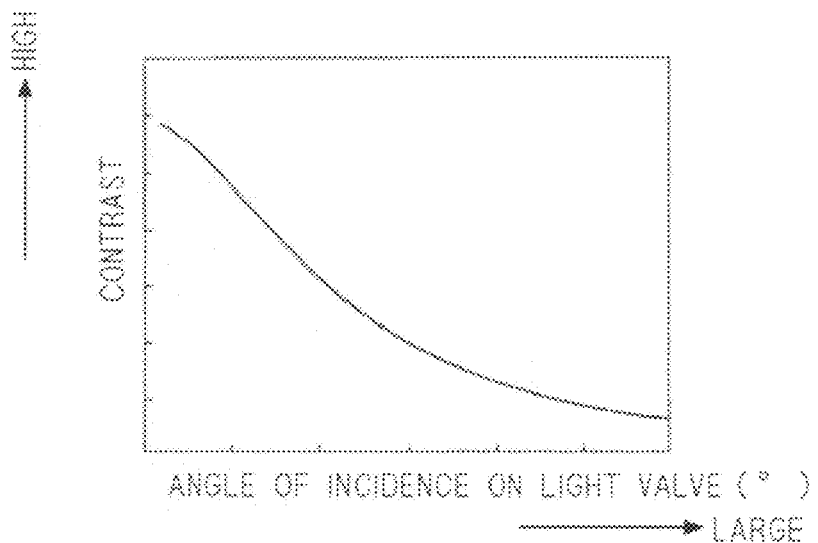
FIG. 29 shows the relationship between the contrast and the angle of incidence of light applied to the light valve according to the third preferred embodiment of the invention.

Light 270 emitted from the second lens array 4b is incident on the light valve 2 at a great incident angle. At this time, since the contrast decreases with increasing incident angle of light on the light valve 2 due to the property of light valves (see FIG. 29), the light shielding bodies 9T and 9B should preferably be configured to block light incident at great incident angles on the light valve 2, i.e., to block incident light in the x direction.

FIG. 28A shows an example of the xy plane of the second lens array 4b and the polarization conversion element 5, in which the right hand part (a) shows a front view and the left hand part (b) shows a side view. FIG. 28B shows a detailed representation of FIG. 2. Also, FIG. 28B shows the paths of light incident on the second lens array 4b. The dotted line part shows the polarization conversion element 5, and the hatched parts show the λ/2 phase-difference plates 5c. In general, polarization conversion is performed with efficiency by concentrating light only in the areas of the λ/2 phase-difference plates 5c. Thus, light beams 270, 271, 272, 273, 274, and 275 are polarization-converted light beams. Referring to FIG. 28B, out of linearly p- and s-polarized incident light, p-polarized light incident on the polarization conversion element 5 is converted into s-polarized light by the λ/2 phase-difference plates 5c and is thus emitted from the x-direction position of the polarization conversion element 5 that is equivalent to the position of incidence; however, it is emitted to the position that is a distance dx (the distance between 275a and 275b) away from the optical axis C as compared with s-polarized light. Therefore, blocking the incident light on the x-direction side of the optical axis C becomes essential to the improvement in contrast. That is, the light beams 270 and 275 have an influence on the contrast. In other words, the application of light beams to positions that are close to the optical axis C in the x direction is the condition for improvement in contrast.

Figure 30:
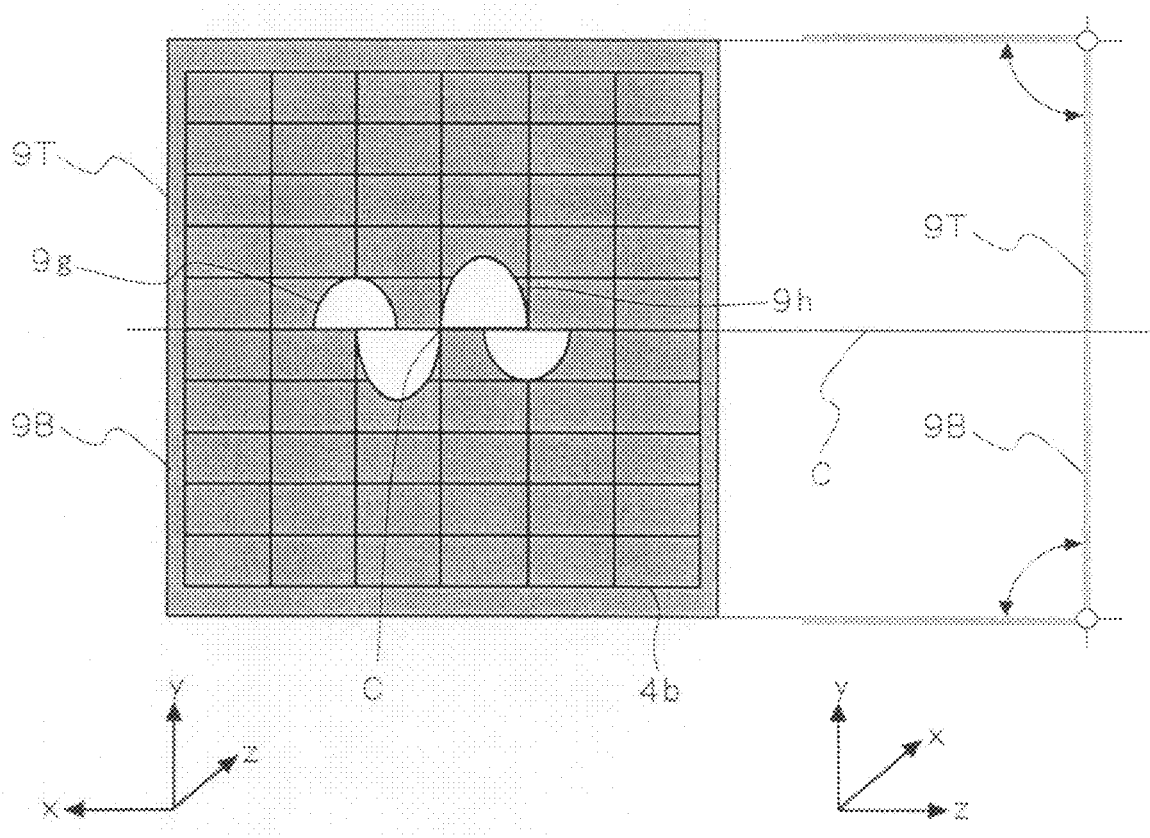
FIG. 30 shows an example of the shape of the turning mechanism according to the third preferred embodiment of the invention.

FIG. 30 shows the shapes of the light shielding bodies 9T and 9B. The light shielding bodies 9T and 9B have two cuts 9g and 9h with different areas at their tips. The cuts 9g have a smaller opening area than the cuts 9h. The cuts 9g and 9h are formed in the light shielding bodies 9T and 9B to have point symmetry with respect to a point on the optical axis C when the light shielding bodies 9T and 9B are closed.

Figure 31:
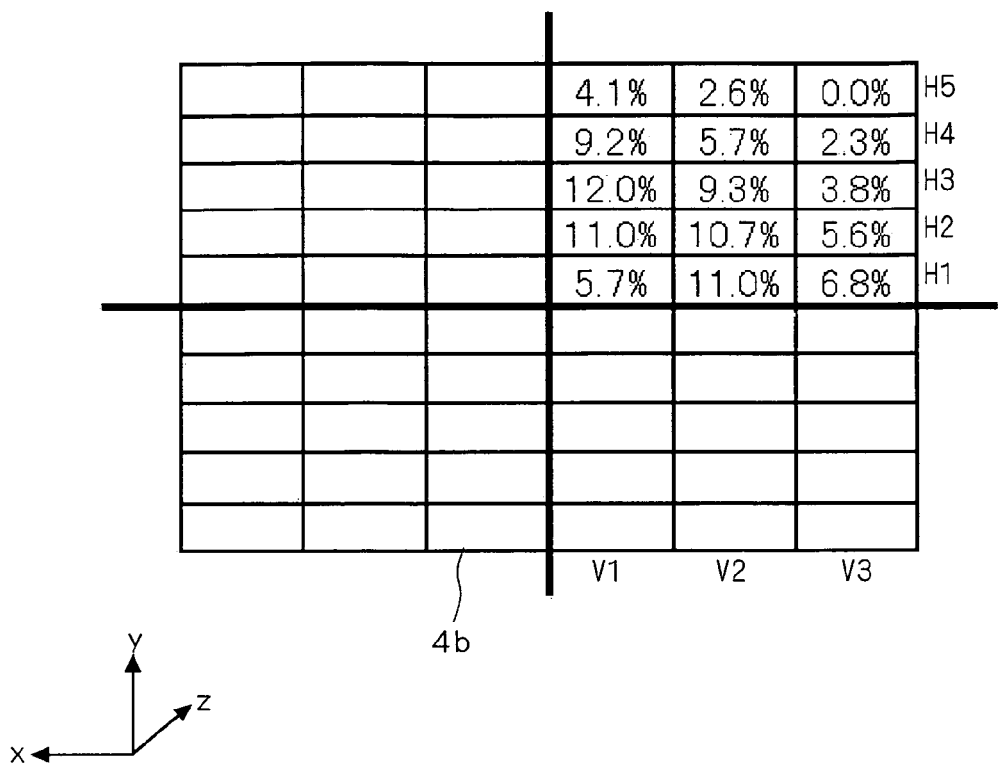
FIG. 31 shows the amount of light passing through each cell in the second lens array 4b according to the third preferred embodiment of the invention.

FIG. 31 numerically shows the amount of light passing through each cell in the second lens array 4b, which amount is calculated by simulation. The shapes of the light shielding bodies 9T and 9B as shown in FIG. 30 can reduce a difference in contrast in the x direction. FIG. 31 representatively shows the upper right quadrant of the second lens array 4b since the second lens array 4b shows a symmetry both between upper and lower halves and between right and left halves.

Figure 32:
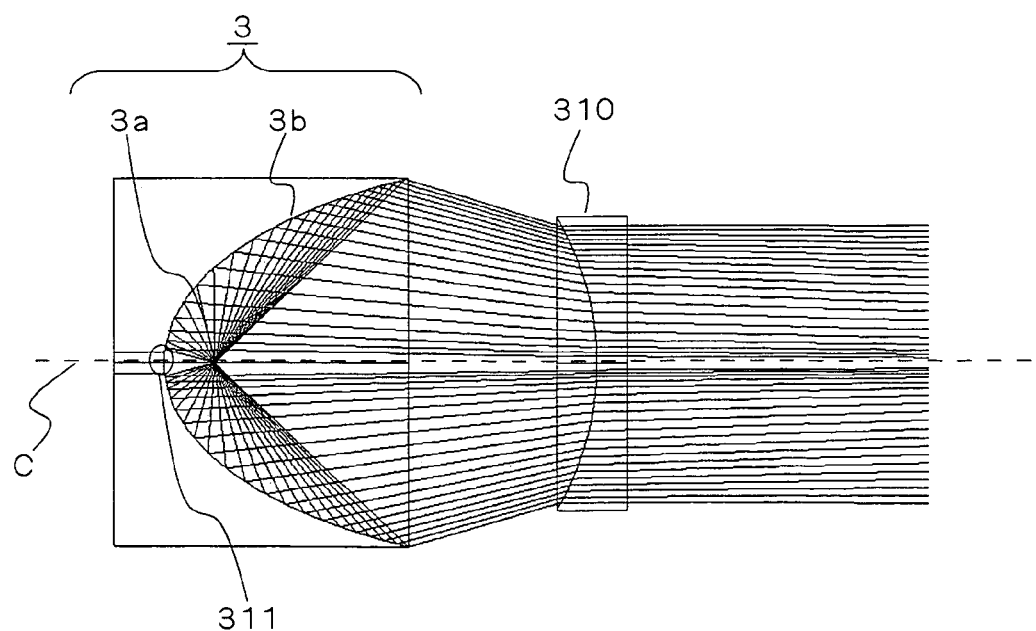
FIG. 32 shows the paths of light emitted from a light source 3 according to the third preferred embodiment of the invention.

FIG. 32 shows the simulation result for the case where light emitted from the light source 3a is reflected off the reflecting mirror 3b. The reflecting mirror 3b shall be in the shape of an ellipse, and light emitted from the light source system 3 shall be made parallel by a concave lens 310. In general, there is a valve of the light source in the vicinity of the optical axis C, and reference character 311 designates an opening of such a valve.

Figure 33:
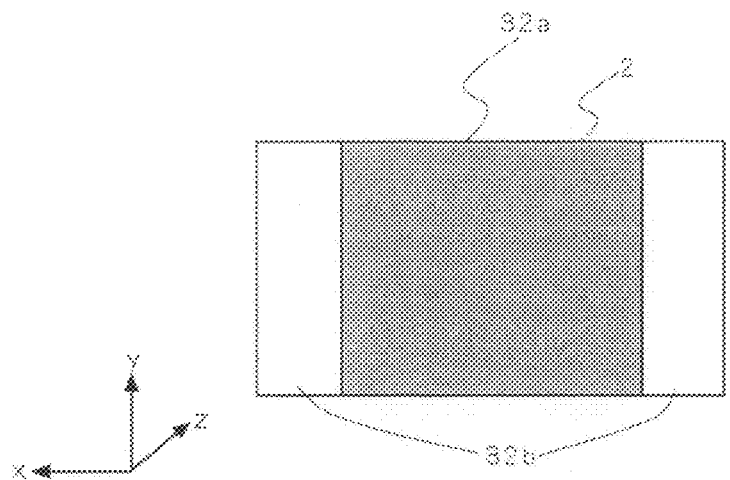
FIG. 33 shows an illumination distribution of light applied to the light valve according to the third preferred embodiment of the invention.

Since the opening 311 is in such a shape as shown in FIG. 311, the cell that is in the fourth column V1 and the fifth row H1 (V1H1) of the second lens array 4b shown in FIG. 31 receives only a small amount of light emitted from the light source system 3. When the light shielding bodies 9T and 9B in the shape of FIG. 30 provide complete light blocking, the cuts 9g irradiate both end portions of the light valve 2 in the x direction, and the cuts 9h irradiate a central portion of the light valve 2. Therefore, a uniform illumination distribution can be obtained by equalizing and superimposing the relative amounts of light applied to the both end portions in the x direction and the central portion of the light valve 2. For example when the cuts 9g and 9h are of the same shape, as shown in FIG. 33, unevenness of illumination occurs due to low illumination in the central portion of the light valve 2. From this, the cuts 9h need to have a larger opening area than the cuts 9g. Referring to FIG. 33, light emitted from the cuts 9g irradiate an area 32b on the light valve 2, and light emitted from the cuts 9h irradiate an area 32a on the light valve 2.

Figure 34:
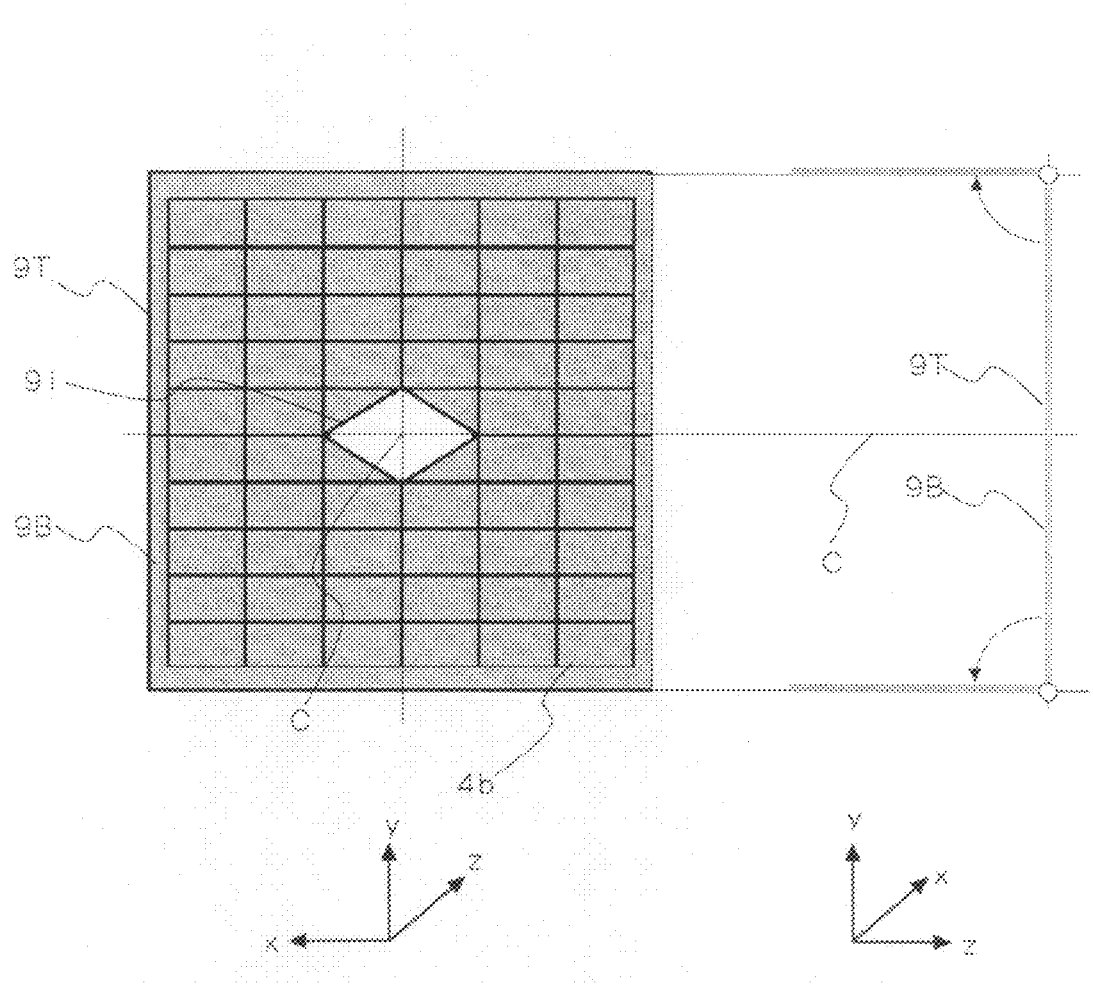
FIG. 34 shows an example of the shape of the turning mechanism according to the third preferred embodiment of the invention.

FIG. 34 shows the shapes of the light shielding bodies 9T and 9B that are determined in consideration of contrast. A cut 9i is formed in the cell (V1H1) to form a right-angled triangular opening, so that a uniform illumination distribution is provided on the light valve 2. However, FIG. 31 shows that only a small amount of light passes through the cell (V1H1). Thus in the case where a 100 percent video signal is displayed on the screen, the contrast of an image projected on the screen is unsatisfactory due to a small amount of light.

From the above, generally, in order to prevent the occurrence of unevenness of illumination on the light valve 2, approximately eight cells are necessary as an opening. However, by consideration of the shape and the relative percentage of the amount of light incident on the opening, illumination uniformity on the light valve 2 can be achieved with approximately four cells. Specifically, the vertex of each of the cuts 9h with a larger opening area in the x direction is made to be equivalent to the x-direction center of the cell (in the fourth column V1 and the fifth row H1) that is closest to the optical axis C, and the vertex of each of the cuts 9g with a smaller opening area is made to be equivalent to a junction between the cell (in the fourth column V1 and the fifth row H1) that is closest to the optical axis C and the adjacent cell (in the fifth column V2 and the fifth row H1) on the opposite side of the optical axis C. By so doing, improvement in contrast can be achieved with approximately four cells, without causing unevenness of illumination on the light valve 2.

Figure 35:
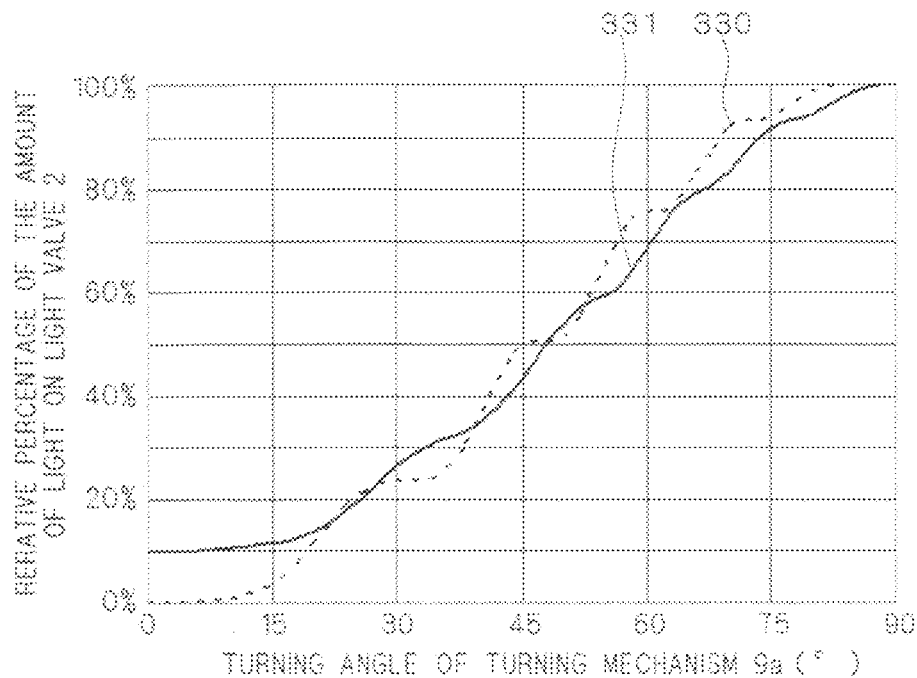
FIG. 35 shows the relationship between the turning angle and the relative percentage of the amount of light in the case where the turning mechanism is in the shape of FIG. 30 according to the third preferred embodiment of the invention.

FIG. 35 shows the relationship between the turning angle and the relative percentage of the amount of light in the case where the light shielding bodies 9T and 9B are in the shape of FIG. 30. The curve 331 shows the simulation result for the turning mechanism 9a with the shape of FIG. 30; and the curve 330 shows the simulation result of FIG. 8 for the turning mechanism 9a with no cut. For ease of comparison, the curve 330 is shifted to overlap with the curve 331. It can be seen from FIG. 35 that the light shielding bodies 9T and 9B in the shape as shown in FIG. 30 allows almost continuous light amount control on the light valve 2 with respect to the turning angle. Accordingly, it can be said that the light shielding bodies 9T and 9B with the tips as shown in FIG. 30 can achieve continuous light amount control without causing unevenness of illumination on the light valve 2, thereby improving the contrast.

While this preferred embodiment illustrates an example of the cuts in the shape of an ellipse, the same effect can be achieved with cuts in the shape of a triangle as long as the same consideration as described in this preferred embodiment is given on the opening area and the positions of the vertices.

Figure 36:
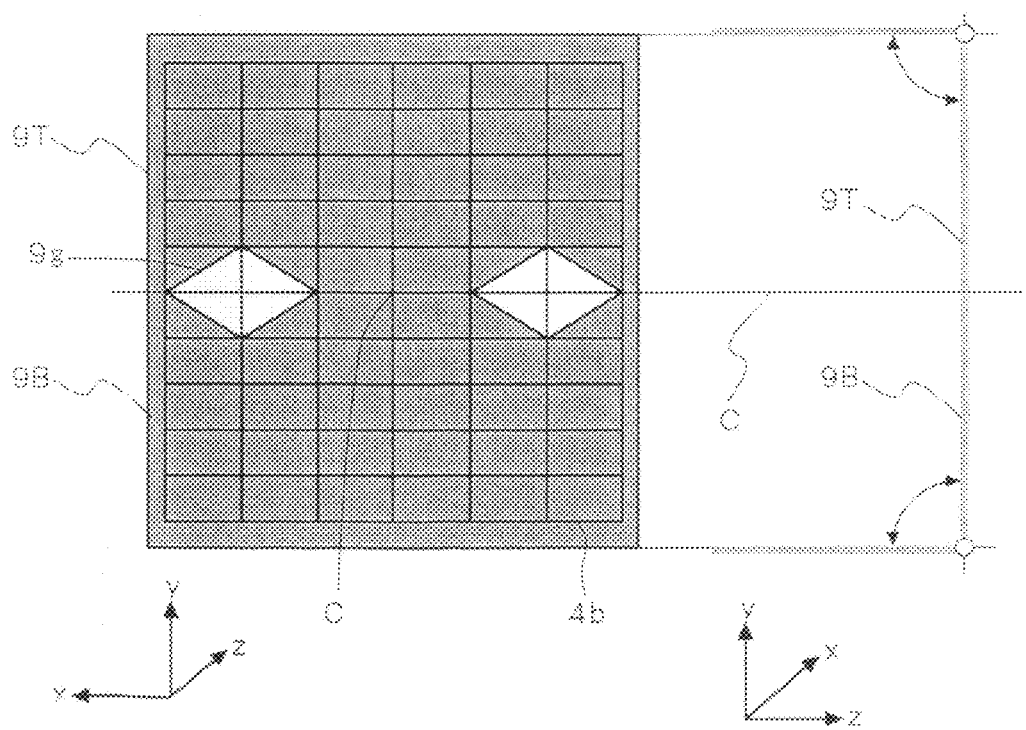
FIG. 36 shows an example of the shape of the turning mechanism according to the third preferred embodiment of the invention.

FIG. 36 shows the shapes of the light shielding bodies 9T and 9B. The light shielding bodies 9T and 9B have triangular cuts formed at their tips. The shape of FIG. 36 allows fine light amount control when the relative percentage of the amount of light is 30% or smaller. Providing the cuts 9g on both sides of the second lens array in the x direction allows fine control of a portion with a low relative percentage of the amount of light. Although only a small number of cells in the second lens array 4b are used for complete light blocking, the triangular shape as shown in FIG. 36 provides a uniform illumination distribution on the light valve 2 by superimposition of irradiated areas, thereby preventing the occurrence of unevenness of illumination.

Figure 37:
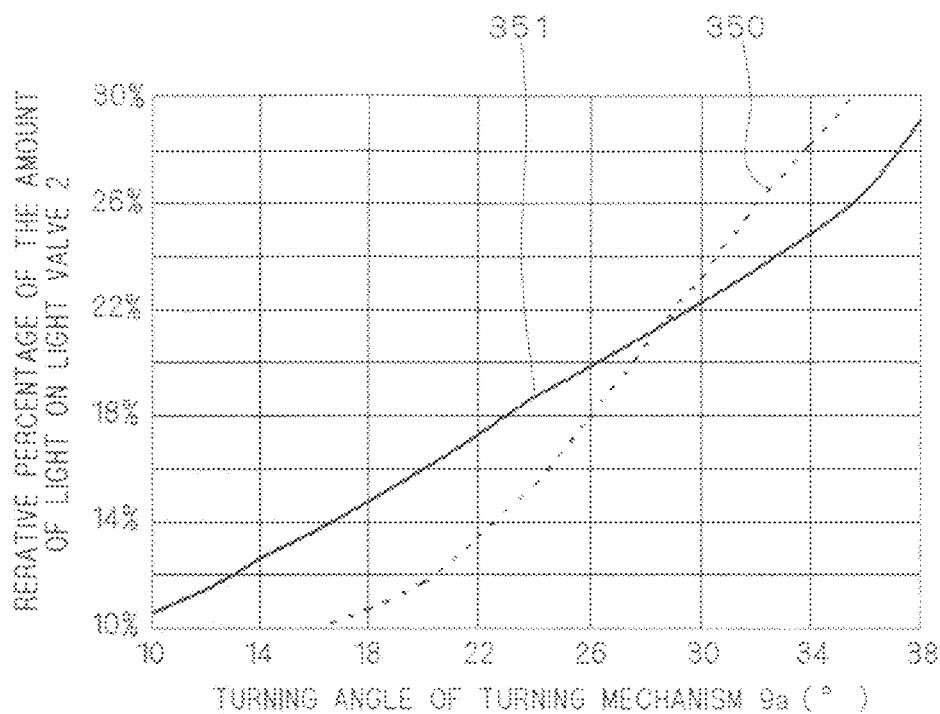
FIG. 37 shows the relationship between the turning angle and the relative percentage of the amount of light in the case where the turning mechanism is in the shape of FIG. 35 according to the third preferred embodiment of the invention.
Figure 38:
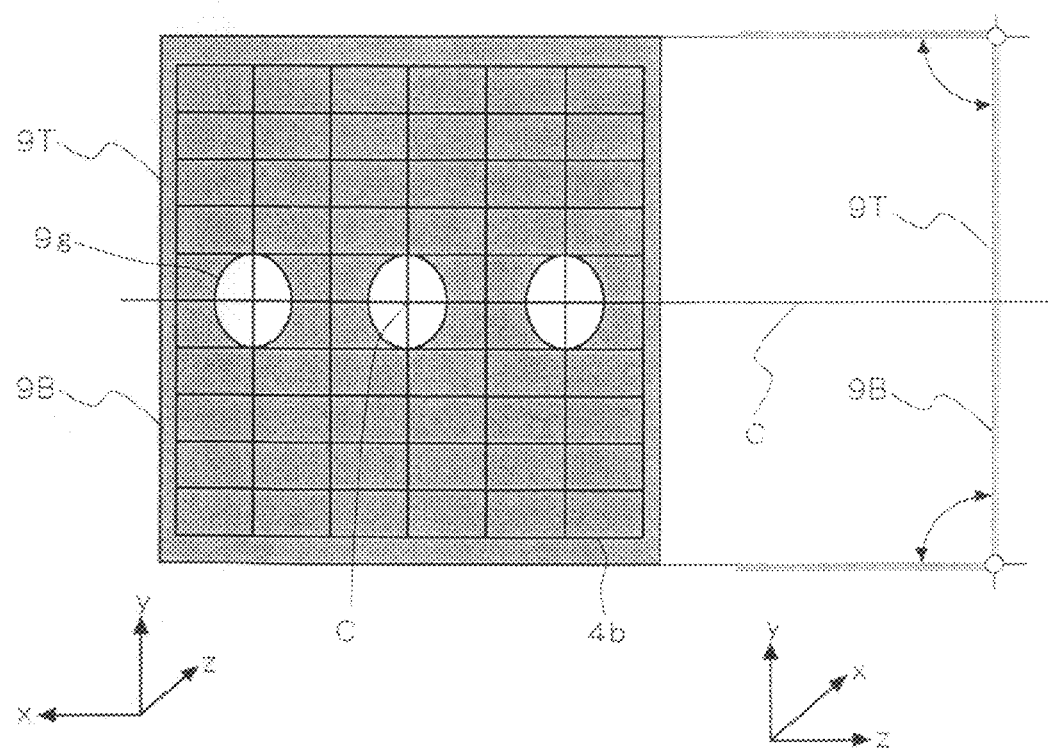
FIG. 38 shows an example of the shape of the turning mechanism according to the third preferred embodiment of the invention.

FIG. 37 shows the relationship between the turning angle and the relative percentage of the amount of light in the case where the light shielding bodies 9T and 9B are in the shape of FIG. 36. The curve 351 shows the simulation result for the turning mechanism 9a in the shape of FIG. 36, and the curve 350 shows the simulation result for the turning mechanism in the shape shown in FIG. 38. For ease of comparison, the curve 350 is shifted to overlap with the curve 351. It can be seen from FIG. 37 that, in the case of the light shielding bodies 9T and 9B of the shape of FIG. 36, the curve has a gentle inclination around the range between 10% and 30%. The reason of such a gentle curve is that, in the case of a small turning angle of the turning mechanism 9a, light blocking in the lens cell in the fourth column V1 and the fifth row H1 shown in FIG. 31 reduces the rate of change of illumination. In the range with a low relative percentage of the amount of light, namely between 10% and 30%, the sensitivity of human eyes to the change in the relative percentage of the amount of light is especially high, so that fine light amount control using the turning mechanism 9a becomes important. The shape as shown in FIG. 36 allows fine light amount control when the relative percentage of the amount of light is 30% or smaller.

From the above description, the light shielding bodies 9T and 9B with the shape as shown in FIG. 36 allow fine light amount control with a low relative percentage of the amount of light.

While the invention has been shown and described in detail, the foregoing description is in all aspects illustrative and not restrictive. It is therefore understood that numerous modifications and variations can be devised without departing from the scope of the invention.

What is claimed is:

1. A projection display comprising:
a light valve;
a light source generating light applied to said light valve;
an integrator lens provided on an optical path between said light source and said light valve and making uniform an illumination distribution of light applied from said light source to said light valve; and
a light-amount control mechanism provided on said optical path and including a pair of light shielding bodies that turn like a double door in order to adjust the amount of light applied from said light source to said light valve,
wherein each of said light shielding bodies is shaped as a plate that is bent substantially along an axis parallel to a turning axis of the light shielding body, the plate being bent toward a closing direction for reducing the amount of light applied to said light valve.

2. The projection display according to claim 1, wherein said light shielding bodies have a cut at their tips.

3. The projection display according to claim 1, wherein each of said light shielding bodies is of substantially uniform thickness except at a tip where the thickness is reduced.

4. The projection display according to claim 2, wherein each of said light shielding bodies is of substantially uniform thickness except at a tip where the thickness is reduced.

5. A projection display comprising:
a light valve;
a light source generating light applied to said light valve;
an integrator lens provided on an optical path between said light source and said light valve and making uniform an illumination distribution of light applied from said light source to said light valve; and
a light-amount control mechanism provided on said optical path and including a pair of light shielding bodies that turn like a double door in order to adjust the amount of light applied from said light source to said light valve,
wherein each of said light shielding bodies is shaped as a plate of substantially uniform thickness except at a tip where the thickness is reduced.

6. The projection display according to claim 5, wherein said light shielding bodies have a cut at their tips.

7. The projection display according to claim 1, wherein said integrator lens includes a first lens array provided on the side of said light source, and a second lens array provided on the side of said light valve, and
said light shielding bodies are provided between said first lens array and said second lens array, and turn in a direction to open toward and close away from said first lens array.

8. The projection display according to claim 5, wherein said integrator lens includes a first lens array provided on the side of said light source, and a second lens array provided on the side of said light valve, and
said light shielding bodies are provided between said first lens array and said second lens array and turn in a direction to open toward and close away from said first lens array.

9. The projection display according to claim 7, wherein the turning axes of said light shielding bodies are between said first lens array and said second lens array and in the vicinity of said second lens array.

10. The projection display according to claim 8, wherein the turning axes of said light shielding bodies are between said first lens array and said second lens array and in the vicinity of said second lens array.

11. The projection display according to claim 1; wherein said pair of light shielding bodies have a larger dimension in a direction of the radius of turning than said integrator lens.

12. The projection display according to claim 5, wherein said pair of light shielding bodies have a larger dimension in a direction of the radius of turning than said integrator lens.

13. The projection display according to claim 2, wherein said cut is formed in the shape of a concave curve.

14. The projection display according to claim 6, wherein said cut is formed in the shape of a concave curve.

15. The projection display according to claim 2, wherein said cut is formed in the shape of a parabola.

16. The projection display according to claim 6, wherein said cut is formed in the shape of a parabola.

17. The projection display according to claim 2, wherein said cut is formed in the shape of a semi-ellipse.

18. The projection display according to claim 6, wherein said cut is formed in the shape of a semi-ellipse.

19. The projection display according to claim 2, wherein said cut is formed in the shape of a triangle.

20. The projection display according to claim 6, wherein said cut is formed in the shape of a triangle.

21. The projection display according to claim 2, wherein said cut includes a plurality of cuts formed in said light shielding bodies.

22. The projection display according to claim 6, wherein said cut includes a plurality of cuts formed in said light shielding bodies.

23. The projection display according to claim 21, wherein said cut includes two cuts that have different areas and are fanned in said light shielding bodies to have point symmetry with respect to a point on an optical axis when said light shielding bodies are closed.

24. The projection display according to claim 22, wherein
said cut includes two cuts that have different areas and are formed in said light shielding bodies to have point symmetry with respect to a point on an optical axis when said light shielding bodies are closed.

25. The projection display according to claim 23, wherein
in an xyz coordinate system where the z axis is a direction of said optical axis, the x axis is a lateral direction orthogonal to said z axis, and the y axis is a vertical direction orthogonal to said z axis and said x axis, said two cuts with different areas are such that:

one of said two cuts which has a larger opening area has a vertex that is on the y-axis direction side of the center of a lens cell that is closest to said optical axis in the x-axis direction in said second lens array, and the other of said two cuts which has a smaller opening area has a vertex that is on the y-axis direction side of a junction between said lens cell and another lens cell that is on the x axis and on the side of said lens cell opposite said optical axis.

26. The projection display according to claim 24, wherein
in an xyz coordinate system where the z axis is a direction of said optical axis, the x axis is a lateral direction orthogonal to said z axis, and the y axis is a vertical direction orthogonal to said z axis and said x axis, said two cuts with different areas are such that:

one of said two cuts that has a larger opening area has a vertex that is on the y-axis direction side of the center of a lens cell that is closest to said optical axis in the x-axis direction in said second lens array, and the other of said two cuts that has a smaller opening area has a vertex that is on the y-axis direction side of a junction between said lens cell and another lens cell that is on the x axis and on the side of said lens opposite said optical axis.

* * * * *